United States Patent
Masiewicz et al.

(10) Patent No.: US 6,192,492 B1
(45) Date of Patent: Feb. 20, 2001

(54) FAST ATA-COMPATIBLE DRIVE INTERFACE WITH ERROR DETECTION AND/OR ERROR CORRECTION

(75) Inventors: John C. Masiewicz, San Jose; Sean R. Atsatt, Santa Cruz, both of CA (US); Jeffrey Alan Miller, Northborough, MA (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/037,468

(22) Filed: Mar. 10, 1998

Related U.S. Application Data

(63) Continuation of application No. 08/491,513, filed on Jun. 19, 1995, now Pat. No. 5,784,390.

(51) Int. Cl.[7] .................................................. H02H 3/05

(52) U.S. Cl. .............................. 714/56; 710/16; 710/22; 710/25; 710/61; 714/805

(58) Field of Search .............................. 395/185.09, 849, 395/881; 714/769, 805, 56; 710/16, 22, 25, 61

(56) References Cited

U.S. PATENT DOCUMENTS

| | | | |
|---|---|---|---|
| 5,191,581 | 3/1993 | Woodbury et al. | 370/85.9 |
| 5,278,902 | 1/1994 | Nugent | 380/42 |
| 5,287,463 | 2/1994 | Frame et al. | 395/325 |
| 5,295,247 | 3/1994 | Chang et al. | 395/325 |
| 5,457,694 | 10/1995 | Smith | 371/20.1 |
| 5,506,958 | * 4/1996 | Myram | 395/182.16 |
| 5,590,316 | 12/1996 | Hausauer | 395/556 |
| 5,594,926 | 1/1997 | Chang et al. | 395/872 |
| 5,758,188 | * 5/1998 | Appelbaum et al. | 395/885 |
| 5,784,390 | * 7/1998 | Masiewicz et al. | 371/40.11 |

OTHER PUBLICATIONS

Bursky, Dave, "Smart Controllers Speed Data Moves, Trim Overheads", Electronic Design Report, Sep. 19, 1994, pp. 85–106.

(List continued on next page.)

*Primary Examiner*—Stephen M. Baker
(74) *Attorney, Agent, or Firm*—Flehr Hohbach Test Albritton & Herbert

(57) ABSTRACT

An ATA-compatible drive interface with error correction and detection capabilities is disclosed. Being fully ATA backward compatible, this interface functions with the same physical cable and connectors as current ATA systems, employs bus drivers that are the same as or backward compatible with those provided by earlier versions of the ATA standard and uses signals with cable signal transitions no faster than those presently seen by current ATA devices. The error detection feature indicates when a data block is erroneously transferred between the device and host; the error correction feature identifies the words transmitted in error and corrects those words on the receiving side of the interface. So that ATA backward compatibility is maintained, the data integrity checking feature does not require additional words in a data transfer, and the data correction feature does not require new data transfer protocols or additional data transfer overhead. Also disclosed are interface circuitry and a new ATA-compatible transfer mode capable of transferring data at 40 MB/sec, the rate supported by local bus adapters for disk drives. Given the physical limits of the ATA cables and connectors, the error correction and detection features are especially useful for correcting data words corrupted during high-speed transmission; however, error correction and detection can also operate independently of the fast transfer mode. Consistent with full backward compatibility, a hard drive configured with the new, fast, error-correcting interface is transparently functional when plugged into a current ATA adapter provided by a legacy computer system.

4 Claims, 12 Drawing Sheets

OTHER PUBLICATIONS

Computer and Business Equipment Manufacturers Association, "Information technology—AT Attachment Interface with Extensions (ATA–2)", Document X3T10, Revision 3, Jan. 17, 1995, 130 pages.

Computer and Business Equipment Manufacturers Association, "Information technology—AT Attachment Interface for Disk Drives", Document X3T9.2, Revision 4, Mar. 5, 1993, 57 pages.

* cited by examiner

ND/OR ERROR CORRECTION

FAST ATA-COMPATIBLE DRIVE INTERFACE WITH ERROR DETECTION AND/OR ERROR CORRECTION

This application is a Continuation of Ser. No. 08/491,513 filed Jun. 19, 1995, now U.S. Pat. No. 5,784,390.

The present invention relates generally to hard disk drives, and particularly to ATA hard disk drive interfaces for personal computers.

BACKGROUND OF THE INVENTION

In personal computers, the most common method of connecting a hard disc drive to a data bus is through the use of the industry standard AT-Attachment or ATA drive interface, which is used in millions of disc drives and systems worldwide.

The current state of the art for this interface limits hard disc data transfer rates to about 16.6 Megabytes per second. This limitation is due to the constraints caused by system compatibility requirements imposed by the ATA standard, which requires that new disk drives built to a new version of the ATA specification must be capable of working in systems produced under earlier versions of the standard.

All of the versions of the ATA standard define the electrical requirements and protocols necessary to transfer data between a disk drive and a host processor, or some other device, across a 40-pin cable. The standard also defines commands issuable over the interface and various status words pertaining to the interface and the status of devices participating in data transfers.

The first version of the ATA standard, herein referred to as ATA-1, defined the two primary methods of data transfer supported by all versions of the ATA interface:

1) Programmed Input/Output ("PIO"), a word by word data transfer between the host and the hard disk device; and
2) Direct Memory Access ("DMA"), a method of bursting blocks of data across the bus under hardware control between a memory and the hard disk device, with minimal involvement from the microprocessor.

For each of these methods, ATA-1 defined several modes of transfer, each mode defining a different transfer rate, the slowest being about 800 kilobytes/sec (mode 0), the fastest being about 8.33 megabytes/sec (mode 2).

In 1994, to provide faster hard drive data transfer rates, the second, and current, version of the ATA standard, ATA-2, was drafted, which, in addition to supporting the older modes, added new modes increasing the maximum transfer rate from 8.33 MB/sec to 16.6 MB/sec. While this represented a doubling in maximum data transfer rates, the new standard failed to remove the I/O bottleneck imposed by the ATA interface as modern disk drive devices and microprocessors are capable of transferring and using data at a much higher rates than 16.6 MB/sec. However, the ATA-2 standard could not support data transfer rates faster than 16.6 MB/sec due to the following limitations imposed by the physical and electrical interfaces and the interface protocol employed by the ATA standard:

1) the ATA physical interface uses low-cost, low-performance cabling for the data path and signal assignments on the cable are poorly arranged so that signals are often degraded during transmission;
2) the input/output drivers employed by the standard electrical interface are derived from very old TTL technology not designed for signal transmission on a cable, which results in poor signal quality; and
3) the interface protocol incorporates built-in read and write overhead, bus high-impedance times and limitations in speed-control protocols.

The limited data transfer rate of the ATA interface was not a problem when I/O operations were performed solely over the slow, industry standard, or ISA, bus, on which data transfer rates could not exceed 8 MB/sec, and more commonly were held to 2 MB/sec. However, in modern microcomputer systems, I/O peripherals are often attached directly to a "local bus," by which is meant the microprocessor's native memory and control bus. In such a configuration, data can theoretically be transferred to and from peripherals at the full speed of the processor and memory subsystems, sometimes as fast as 100 MB/sec. Also contributing to the high data transfer rates possible over local busses is the fact that local busses are 32 bits wide as opposed to the 16 bit ISA bus and ATA standard.

To take full advantage of the local bus, system integrators have begun to ship computer systems with local bus adapters for disk drives, the adapters being capable of transferring data to the host at rates exceeding 40 MB/sec. However, given the current limitations of the ATA disk drive interface, there would be limited improvement in attaching an ATA disk drive to the local bus via one of these new adapters. Another challenge to such an implementation is that an ATA disk drive provides only 16 bits of data, not the 32 expected by the local bus and the host local bus adapter.

Consequently, there is a need for an ATA-compatible hard disk interface that is capable of transferring data at the fastest rate supported by the local bus adapters for disk drives. To be ATA-compatible, this interface should function with same physical cable and connectors, and cable lengths as in current ATA systems. This interface should also employ bus drivers that are the same as or backward compatible with those provided by earlier versions of the ATA standard; also, signal transitions seen on the cables should be no faster than those presently seen by current ATA devices.

Moreover, given that the target 40 MB/sec data transfer rate will push the physical limits of the ATA cables and connectors, which are already taxed at the current maximum transfer rates, there is a need for the new interface to provide data integrity checking and data correction for data words that could be corrupted during high-speed transmission. Of course, so that ATA backward compatibility is maintained, the data integrity checking feature must not require additional words in a data transfer, and the data correction feature must not require new data transfer protocols or additional data transfer overhead.

Finally, the need for full backward compatibility requires that a hard drive configured with the new, fast, error-correcting interface be transparently functional when it is plugged into a current ATA adapter provided by a legacy computer system, which is an existing or new computer system with ATA interfaces that comply with only the older versions of the ATA standard.

SUMMARY OF THE INVENTION

The present invention is a fast, ATA-compatible drive interface with error correction/detection capabilities that meets the needs outlined above.

Specifically, the present invention is an ATA-compatible method of implementing fast, reliable data transfers across a data bus between a host and a device in a computer system having a host processor, a peripheral device such as a hard disk drive and a data bus including data lines carrying data signals when the bus is active and high impedance signals when the bus is inactive, DMA request and acknowledge lines and a data strobe line carrying a periodic data strobe. The method includes the following steps:

(a) the device asserts a DMA request on the DMA request line at a first time;

(b) the host asserts a DMA acknowledge on the DMA acknowledge line at a second time in response to the DMA request;

(c) the host activates the data strobe at a third time, the third time being after the second time, the difference between the second and third times being long enough for a data word placed on the data bus at a fourth time between the second and third times to stabilize by the third time, the data strobe making a first transition at the third time and a second transition at a fifth time, the difference between the third and fifth times being long enough for a data word placed on the data bus at an sixth time between the third and fifth times to stabilize by the fifth time;

(d) a sender selected from the host or the device places a first data word on the data bus at the fourth time, removes the first data word after the third time, and, without placing the data bus in a high impedance state, places a second data word on the data bus at the sixth time; and (e) a receiver selected from the one of the host or the device not being the sender inputs reads the first and second data words from the data bus at the third and fifth times respectively.

To satisfy compatibility requirements, the host first determines whether the device is compatible with the fast transfer method, and if not, conducts data transfers according to one of several legacy data transfer modes.

The present invention also provides several different error detection/correction modes to detect or correct words erroneously transferred during a block data transfer.

In a first error detection mode, the present invention provides data integrity checking for full block transfers (typically 512 bytes or 256 16-bit data words). This error detection mode involves the following steps:

(a) the sender accumulates each of the data words placed on the data lines into a send checksum;

(b) the receiver accumulates each of the data words received from the data lines into a receive checksum;

(c) after sending the last data word of the data block, the sender places the send checksum on the data lines after a last high to low transition of the data strobe and before the host deasserts the DMA acknowledge;

(d) upon the host deasserting the DMA acknowledge, the receiver inputs the checksum then compares the send checksum to the receive checksum, any difference between the checksums indicating a data transfer error.

The present invention also provides a second error detection mode in the situation where the device suspends or throttles the data transfer before the full block has been transferred. This second mode involves the following steps:

(a) the sender accumulating each of the data words placed on the data lines into a partial send checksum;

(b) the receiver accumulating each of the data words received from the data lines into a partial receive checksum;

(c) upon the device suspending the data transfer by deasserting the DMA request before the data transfer is finished, the sender places the partial send checksum on the data lines;

(d) upon the host deasserting the DMA acknowledge in response to the deassertion of the DMA request, the receiver inputs the partial send checksum, compares the partial send checksum to the partial receive checksum, any difference between the checksums indicating a data transfer error, and deasserting the DMA acknowledge, thereby indicating to the sender that the data transfer is complete, the sender subsequently zeroing the partial checksum so that, upon finally completing the data transfer, the partial checksum will be the sum of all data words in the data block.

In a variation of step (d) in the device-throttled case, the sender of the present invention transmits the partial send checksum and then resumes accumulating the partial checksum without the intervening step of zeroing the checksum. Thus, in this variation, the last partial checksum transmitted is the checksum of all data words in the data block.

The present invention also provides a third error detection mode in the situation where the host suspends or throttles the data transfer before the full block has been transferred. This third mode involves the following steps:

(a) the sender accumulating each data word placed on the data lines into a send checksum;

(b) the receiver accumulating each data word received from the data lines into a receive checksum;

(c) upon the host suspending the data transfer by deasserting the DMA acknowledge, the device relinquishing the data bus while continuing to assert the DMA request and the host and the device internally retaining the send and receive checksums;

(d) upon the host resuming the data transfer by reasserting the DMA acknowledge, executing steps (a) through (d) until the last data word of the data block has been received by the receiver;

(e) upon accumulating the last word sent by the sender into the receive checksum, the receiver comparing the send checksum to the receive checksum, any difference between the checksums indicating an error in the data transfer. This can continue repeatedly over multiple transfers if desired.

The present invention also provides a fourth, or negotiated block, error detection mode, which is similar to the two device-throttled modes described except that the host first sends the device a block count which determines how often the device must suspend the data transfer and transmit a parity word to the host.

Finally, the present invention provides a method for error correction, which is operable in any of the error detection modes described above, but involves the sender and the receiver computing error correction codes (ECCs) from the data words sent and received instead of simple error detection words. Error correction involves the following steps:

(a) based on the difference between the parity words, the receiver determines words in error, the words in error being those of the data words erroneously transmitted between the sender and the receiver, and generates an error mask for each of the words in error; and (b) the receiver corrects the words in error by exclusively ORing (XORing) the words in error with the error masks.

The error correction method of the present invention can be performed in conjunction with the fast transfer data protocol set out above or can be performed with any of the slower, legacy-mode data transfers. In either case, the error detection/correction method of the present invention is compatible with all ATA data transfer protocols, wherein a device initiates the ATA data transfer by asserting a DMA request signal to which a host responds by asserting a DMA acknowledge signal then initiating a data strobe that remains active as long as the DMA request and the DMA acknowledge signals are asserted, the ATA data transfer involving a sender being one of the host or the device placing a data word on data lines and a receiver being the other of the host or the device inputting the data word from the data lines, the placing and the inputting occurring on predetermined edges of the data strobe.

The present invention also sets out interface circuitry for implementing the preceding methods in a manner compatible with prior art ATA interface circuitry, wherein the prior art circuitry is responsive to external data signals, an external read strobe, an external write strobe, an external DMA acknowledge (DMA ACK) signal and an internal DMA request (DMA REQ) signal, wherein the device interface circuit includes a data bus, read and write pipeline registers, read and write FIFOs, a command decoder that generates a data transfer (DATA XFR) signal in response to a host data transfer command placed on the data bus, a transfer enable gate that generates a transfer enable (XFR ENA) signal when the DMA ACK and the DMA REQ signals are asserted, and read/write AND gates that generate read/write clock signals by ANDing the DATA XFR signal, XFR ENA signal and the external read/write strobes, the read pipeline register only being enabled for output to the data bus when the read clock signal is asserted, the write pipeline register inputting a data word from the data bus on every high to low transition of the write clock signal. More specifically, the fast data transfer and error correction interface circuitry includes the following improvements over the prior art circuitry:

(a) fast-transfer-enabling circuitry driven by the write clock and read clock signals and connected to the write and read pipeline registers for enabling the write and read pipeline registers to input and output the data from and to the data bus on every edge of the write and read clock signals, respectively;

(b) command control logic with inputs tied to a status input from the first command decoder and the data bus that asserts a READ COMMAND signal when the first command decoder asserts the COMMAND/STATUS signal and continuing to assert the READ COMMAND as long as data transfer has not been finished; and (c) a bus-enabling AND gate with two inputs tied respectively to the XFR ENA and the READ COMMAND signals, the output of the bus-enabling AND gate being an output enable (OE) signal that remains asserted as long as the data transfer is underway, the OE signal being tied to the output enable pin of the read pipeline register, thereby continually enabling the read pipeline register for output for low and high signal levels of the read clock signal.

Additional circuitry is provided to implement the error correction and detection methods of the present invention.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
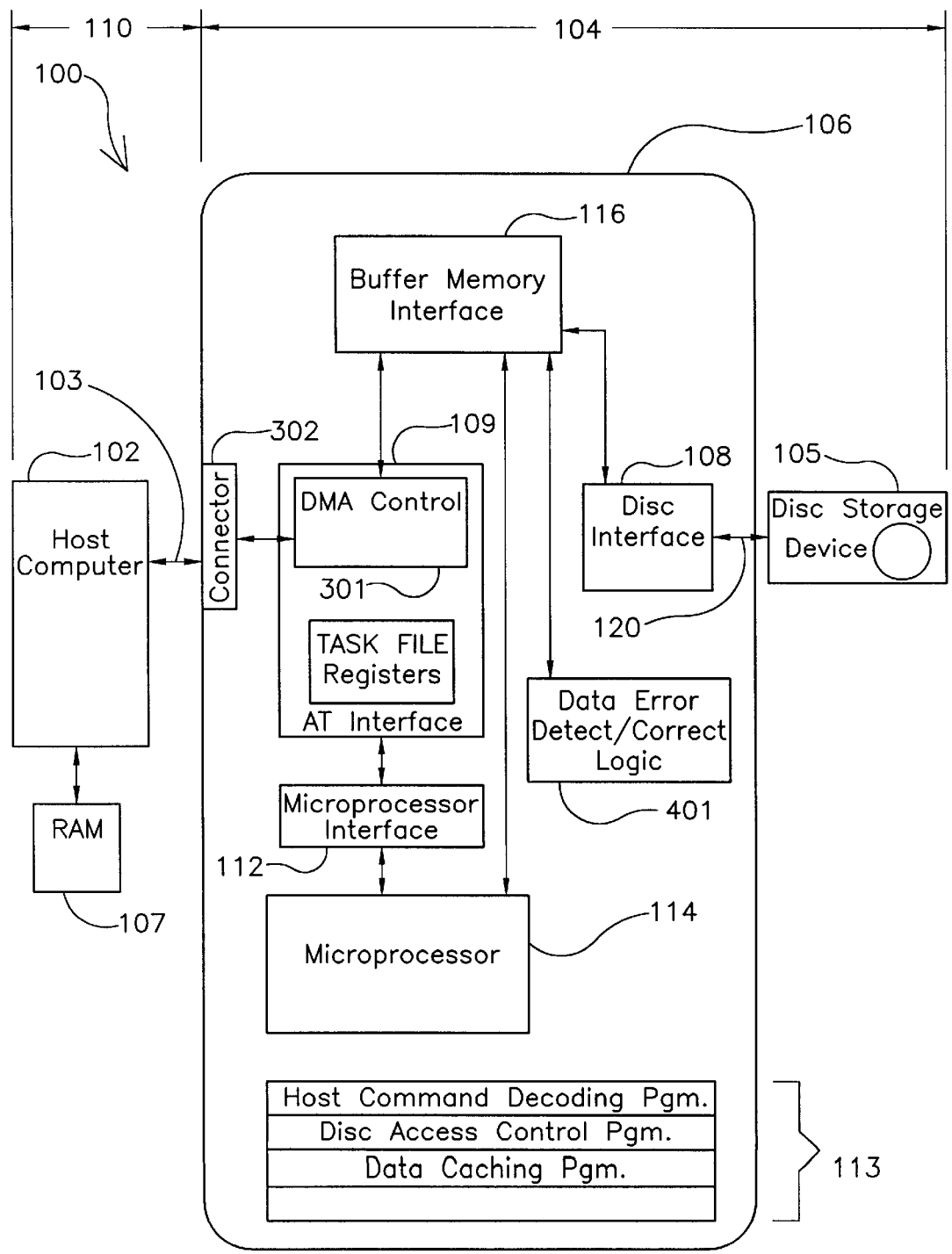
FIG. 1A is a block diagram of a computer system showing a data bus, a host computer and a disk drive device.

FIG. 1 shows a computer system 100 having a host-computer 102 linked to a disc storage device 105 by a disk controller 106. The disc storage device 105 is typically a hard magnetic disk, but can be any secondary memory device having an access time that is significantly longer that of the random access memory (RAM) devices 107 used in the computer system 100. For the purposes of the present invention, the disk storage device 105 and the disk controller 106 shall be referred to as the "device 104" and the other aforementioned components collectively as the "host 110".

The disc controller 106 includes a number of internal interfaces, including a disk interface 108 linking the disk storage device 105 to the disc controller 106, a host interface 109 (hereinafter called the AT interface) linking the host computer 102 to the controller 106 via an ATA connector 302, a microprocessor interface 112 linking a microprocessor 114 (sometimes called a microcontroller) to the controller 106, and a buffer memory interface 116 linking the controller 106 to a disc cache memory 118.

The AT interface includes DMA control logic 301, which coordinates DMA data transfers between the host and the device. As part of its duties, the DMA control logic 301 relays data to and from the buffer memory interface and host commands to the task file registers of the AT interface, from which the commands are input to the microprocessor 114 via the microprocessor interface 112. The microprocessor's software programs are shown collectively as block 113 in FIG. 1. These programs are responsible for transferring data from/to the disk storage device 105 through the disc interface 108 and the AT interface 109 to/from the host computer 102. The software 113 includes a host command decoding program 115, disc access control program 117 and data caching program 119.

In the present invention, the AT interface 109 reads and decodes commands requested by the host computer 102. If the host command is a read command and the requested data is determined by the AT interface to be in the disc cache 118, then that data is transferred from the disc cache 118 through the buffer memory interface 116 and AT interface 109 to the host computer 102 without microcontroller 114 intervention.

If the requested data is not in the disc cache 118, then the microcontroller 114 instructs the disc interface 108 to transfer the requested sectors to the disc cache 118. This command is relayed by the disc interface 108 to the disk storage device 105 over the data bus 120. If the host command is a write command, then the microcontroller 114 issues the write command to the disc interface 108, which, again, relays the command to the disk storage device 105 over the data bus 120. Error detection and correction for the data transfers are provided by data error correction logic 401 coupled to the buffer memory interface 116 and the disc interface 108.

Figure 1B:
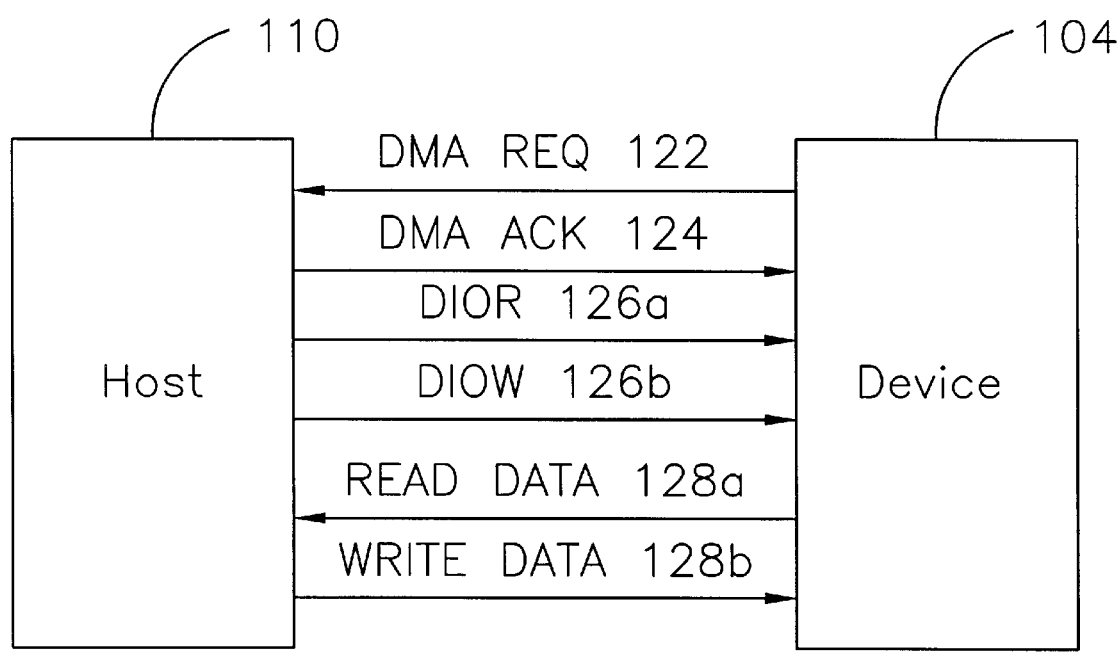
FIG. 1B is an expanded view of the data bus from FIG. 1.

Referring to FIG. 1B, there is shown an expanded view of the data bus 103, which includes a DMA Request line (DMA REQ) 122, a DMA acknowledge line (DMA ACK) 124, data input/output read and write data strobe lines (DIOR/DIOW) 126a, 126b and a set of 16 data lines 128 which, at times in the following discussing, will be treated as separate sets of read (READ DD0-15) and write (WRITE DD0-15) lines 128a and 128b.

While the present invention is compatible with either of the two legacy ATA methods of data transfer, programmed I/O and DMA, the remainder of this discussion will be directed to DMA data transfers, which is the preferred method capable of supporting data transfers at rates faster than 16.6 MB/sec. As DMA data transfers are well known, the present discussion will not explain the basics of DMA data transfers, but will analyze the present ATA protocol for wasted bandwidth, set out an ATA-compatible protocol for eliminating the waste in the present interface, therefore speeding up hard drive data transfers, describe several methods of data transfer error detection compatible with the ATA standard and describe methods and circuitry for error detection and correction.

DATA TRANSFER PROTOCOLS
Current ATA Data Transfer Protocol (16.6 MB/Sec)

Figure 2:
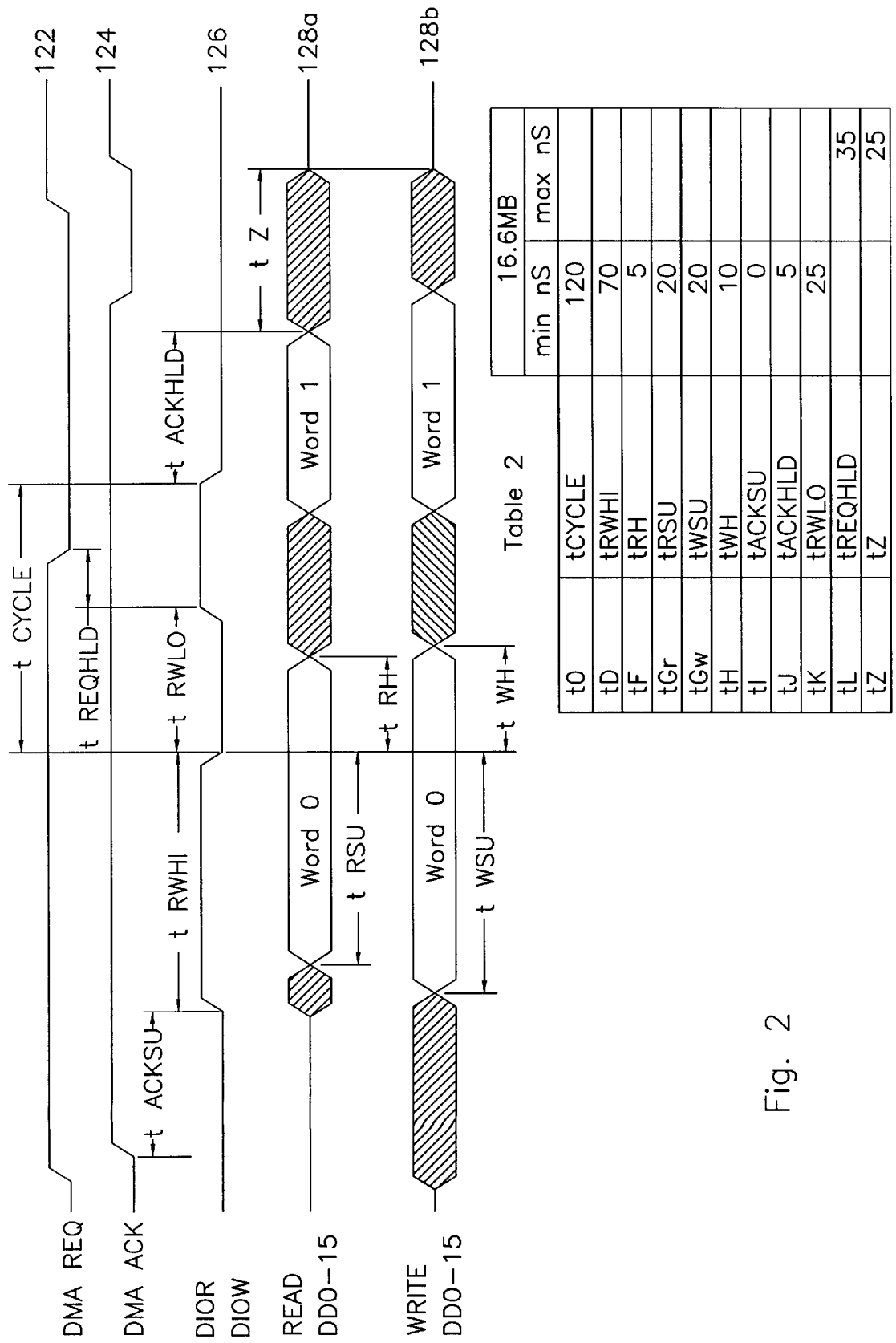
FIG. 2 is a timing diagram and table showing operation of the current ATA interface at a 16.6 MB/sec data transfer rate.

Referring to FIG. 2, there is shown a timing diagram and table illustrating a DMA data transfer occurring over the current ATA interface at a 16.6 MB/sec data transfer rate. In this and all other figures discussed herein, asserted signals are shown on the data lines 122–128 as high voltage levels, deasserted signals as low voltage levels, and high impedance signals (indicating periods when the bus is disabled) by cross-hatching. The times shown on the timing diagram are for illustrative purposes and are not scaled; actual times are shown in Table 2, where they are indexed by time increment identifiers corresponding to those shown on the timing diagram. E.g., Table 2 shows that a time period designated "tRWLO" (the name will be explained later) has a minimum length of 25 nanoseconds. The times shown in Table 2 are those specified by the ATA standard. As in all of the remaining figures, it is assumed that the data transfer illustrated by FIG. 2 is between the host 110 and the disk drive device 104.

As the first step in a DMA transfer, the device 104 asserts a DMA request signal (DMA REQ) on the DMA request line 122, requesting control of the data bus 103 for DMA read or relinquishing control for DMA write from the host 110 for a DMA operation (either for a host read or a device write). The host 110 acknowledges the request by asserting a DMA acknowledge signal (DMA ACK) on the DMA acknowledge line 124, after which the local bus 103 belongs to the sender (the device 104 on reads or the host 110 on writes) until the data transfer is finished or suspended. After waiting for an acknowledge setup time (tACKSU) of at least 0 ns after the assertion of the DMA ACK signal, the host 110 initiates a periodic read/write strobe signal DIOR-DIOW (i.e., the host activates the DIOR signal if reading, and the DIOW signal if writing), which is asserted for a time tRWHI of approximately 70 ns and deasserted for a time tRWLO of approximately 50 ns per cycle. According to the ATA standard, the high to low transitions of the DIOR-DIOW signal trigger the receiver (the host 110 on reads or the peripheral disk drive device 104 on writes) to input a data word placed on the READ/WRITE DD0-15 lines by the sender. To ensure that the data to be received is stable, a data word such as Word_0 or Word_1 must be on the read/write data lines 128a/128b for a read/write setup time tRSU/tWSU of no less than 20 ns before the occurrence of the high to low transition of the DIOR-DIOW signal. Similarly, after that high to low transition, a data word must remain on the read/write data lines 128a/128b for a read/write high time tRH/tWH of no less than 5/10 ns. Under the current ATA protocol, adjacent words (e.g., word 0 and word 1) in a transmitted data block are separated by a high impedance or tri-state signal tZ placed on the data lines DD0-15 for a maximum of 25 ns.

After receiving the DMA ACK signal, the device drops the DMA REQ signal within a request hold time tREQHLD of 35 ns after the high to low transition of the second cycle of the present data transfer. In response, the host drops the DMA ACK signal within an acknowledge hold time tACKHLD of 5 ns following the second high to low transition of the DIOR-DIOW signal in the current data block transfer. Once the ACKHLD signal is dropped, the data bus is once again under control of the host 110. Note that although only two transfers are shown in the timing diagram, typically an entire block will be transferred.

Data is valid on the data lines 128 for approximately 25–30 ns out of a cycle time of 120 ns, or only about 25% of the time. This is because the prior art ISA bus, which gave rise to the current ATA interface specification, assumed that each I/O cycle was independent and that the device therefore had to interpret each read or write strobe of data separately from prior or subsequent data transfer operations. Consequently, to prevent any data from appearing on the bus during this processing time, which amounted to approximately 75% of a data transfer cycle, the prior art ATA interface specified that the bus should be tri-stated or undefined between cycles (or in other words, that the data lines 128 typically be placed in a high-impedance state). By treating each cycle as independent and disabling (tri-stating) the bus between cycles, the ATA interface introduces significant overhead that limit data transfer rates. As transfers on the ISA bus were limited to approximately 8 MB/sec, even the first version of the ATA protocol, which supported a maximum data transfer rate of 8.33 MB/sec, was not an I/O bottleneck. However, that is not the case with today's systems, which provide local bus drive interfaces capable of transferring data from the disk drive device 104 to the microprocessor at rates approaching 50 MB/sec.

One method of speeding up the current ATA interface seems obvious: simply speed up the transfer rate. However, this approach does nothing to eliminate the fixed overhead in the system due to cable delays, signal skew and fixed tri-state times, which, when combined with smaller data valid times, actually decrease the percentage of time data is valid on the data bus 103. Consequently, to provide a faster ATA interface, the present invention increases the bandwidth of the interface by eliminating the overhead present in the prior art ATA protocols, then uses the freed up bandwidth in a way that is efficient and compatible with legacy systems.

Fast ATA-Compatible Data Transfer Protocol (40 MB/sec)

The fast data transfer method of the present invention increases the data transfer rate of the prior art ATA interface to 40 MBsec by implementing the following strategies for utilizing wasted bandwidth (or overhead) in the standard prior art data transfer protocols:

1. maintain the bus in an enabled state throughout the entire data transfer operation instead of disabling the bus between each transmitted word as shown in FIG. 2; and
2. transfer a data word on every edge of the data strobes DIOR and DIOW.
3. reduce data strobe cycle times from the prior art 120 ns to 100 ns.

The impact of these changes, which are discussed below, can be seen in FIG. 3, which displays a timing diagram and table that illustrate the fast ATA-compatible data transfer protocol of the present invention.

1. Seamless Data Transfer

To eliminate the wasted bandwidth taken up by high impedance signals on the data lines 128, the present invention maintains the enabling of the data bus 103 in the active mode; i.e., in the present invention, the data lines 128 do not enter a high-impedance mode between transferred words in a data block. Thus, as shown in FIG. 3, a second data word Word_1 is placed on the data lines 128 immediately after a first word Word_0 is removed. The data lines 128 transition to an invalid state or tri-state only after the device terminates the block data transfer by dropping or deasserting the DMA REQ signal.

Having eliminated overhead due to tri-state signals, the next issue resolved by the present invention was determining how best to utilize the freed up bandwidth so as to achieve a data transfer rate of 40 MB/sec (corresponding to transferring one data word every 50 ns as compared to every 120 ns as in the current ATA interface).

One possible solution is to reduce the period of the data strobe signal DIOR-DIOW to 50 ns, meaning that, as in FIG. 2, the receiver will input a new word from the data lines 128 whenever the DIOR-DIOW signal on line 126 is deasserted, but, unlike FIG. 2, this will occur every 50 ns instead of every 120 ns. While this solution provides the desired 40 MB/sec transfer rate, it creates other problems related to the fact that the frequency of the data strobe on line 126 is reduced to 25 ns from 60 ns in the prior art. Due to the fixed overhead of cable delay, signal skew, ringing and settling time, as well as setup and hold-time requirements of CMOS technology (embodied in the times tRH, TRSU, tWH and tWSU), a 25 ns half-cycle data strobe signal could not reliably controlled in the present ATA environment. Moreover, following the Nyquist rule, a DIOR-DIOW signal that changes every 25 ns could only be generated from a clock that changes every 12.5 ns, which requires a clock signal with an 80 MHz clock frequency. Many of today's systems do not have such a clock and, even in a commercial setting, controlling such a clock would be challenging and costly. Finally, given that, in the prior art, the bus drivers were TTL compatible, it would not be desirable for cost and compatibility reasons to provide new bus drivers with the new interface of the present invention.

2. Two-edged clocking from data strobe

Figure 3:
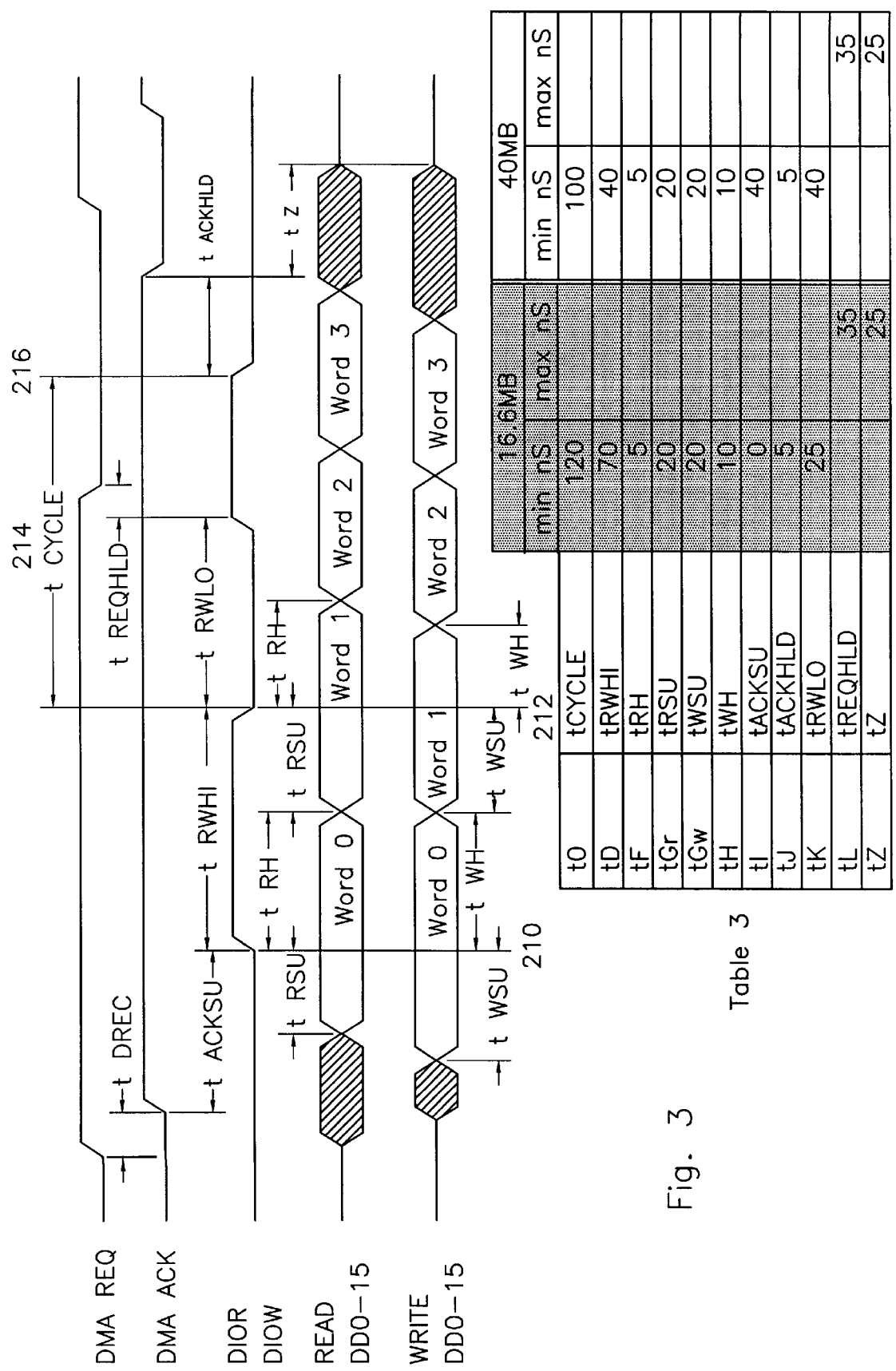
FIG. 3 is a timing diagram and table showing operation of the fast ATA-compatible interface at a 40 MB/sec data transfer rate.

The second solution, that adopted by a preferred embodiment of the present invention, is illustrated in FIG. 3. In this method, the present invention achieves the target 50 ns data transfer rate by reducing cycle time only slightly, from 120 ns to 100 ns, and using both edges of the data strobe signal DIOR-DIOW to trigger data transfers. For example, at the data strobe edge 210, Word_0 is available on the data lines 128, then 50 ns later, at edge 212, Word_1 is available. As a result of this new method of using the data strobe DIOR-DIOW 126, the present invention achieves a 40 MB/sec data transfer rate while still using compatible drivers and cabling.

To realize this novel approach, the fast data transfer protocol of the present invention embodies other significant changes over the prior art protocol, including 1) changing the minimum data strobe DIOR-DIOW deassertion time tRWLO from 25 ns to 40 ns, and 2) increasing the minimum setup time tACKSU, which determines how long the data bus 128 is enabled before the first DIOR-DIOW transition is triggered, from 0 ns to 40 ns. These and other differences between the fast ATA compatible interface of the present invention and the prior art are set out in Table 3, which summarizes time intervals for the 16.6 MB/sec prior art interface and the present 40 MB/sec method.

The increase in the minimum data strobe deassertion time tRWLO and the corresponding decrease (from 70 ns to 40 ns) ) in the minimum data strobe assertion time tRWHI was made in the present method to balance the data transfer cycles for words being transferred on both a low to high edge 210 and a high to low edge 212. The increase in the minimum tACKSU time was necessitated by the fact that, to use the first edge of the present invention, the bus must be enabled and the data on the data lines 128 stable for some time before the first edge 210. This was not an issue in the prior art, where data was transferred only upon the occurrence of a falling edge such as the edges 212 and 216. This additional delay (from 0 ns to 40 ns) does not materially affect bus utilization as it only occurs once per each data transfer phase (typically, once per 256 words, or 512 bytes, the typical size of a block of data that is transferred in a single transfer phase). In fact, most legacy systems already incorporate this setup time tACKSU as part of their protocol overhead to account for necessary data and clock synchronization times.

Compatibility

A disk drive equipped with the present fast interface can still operate in legacy systems as the new mode (i.e., 40 MB/sec) of transfer will only be used when selected by the host 110. There are no hardware incompatibilities, and the current interface hardware can be designed to operate with one or both edges of the clock with little difficulty. The additional set up time tACKSU (changed from 0 ns in the prior art to 40 ns in the present interface) for the first word Word_0 can be implemented in legacy systems without violating slowed transfer modes. The ATA interface standard requires all systems to initialize or power-up in one of the old legacy modes, with which a drive equipped with the fast interface is fully compatible; thus, there is no risk that a new system will power up in a data transfer mode not supported by the disk drive device 104. If the host is a newer system compatible with the present fast protocol; upon powering up, the host can interrogate the drive using the "Identify Drive" interface command to determine if the drive can operate in the new fast (40 MB/sec) data transfer mode. If so, the host can send a "Set Features" command to place the device in the new, fast transfer mode. These commands are not discussed herein as they are currently defined by the standard and are easily extended to support new modes.

DATA AND BUS INTEGRITY

One of the biggest concerns about increasing the data transfer rate across a poorly-controlled interface and cabling system such as the ATA interface, is that of reduced reliability of data transfers. Specifically, the principal concern is that, by squeezing the timing tighter, the system becomes more prone to errors caused by noise, power fluctuations, poor cabling practices and other reasons. This concern is especially justified for ATA interfaces, which employ old technology and low cost solutions. Consequently, for the fast, ATA-compatible data transfer method of the present invention to be accepted, it must provide methods presently not available in the ATA interface to ensure data integrity. To meet this need, the present fast data transfer method provides for both error detection and error correction for data transfers across the ATA interface.

Error Detection and Correction

Before setting out the error detecting scheme employed by the present invention, the following discussion sets out two previously proposed solutions that would be unacceptable in the context of the present invention due to legacy compatibility concerns. First, one might envision adding parity to the bus, which would require that an additional signal line be added to the data bus lines 122–128. This could be easily accomplished by multiplexing the parity signal with signals on the existing data bus lines 122–128. However, parity is not satisfactory as it only detects a small portion of possible errors, and provides no mechanism for error-correction.

Second, CRC (cyclic redundancy check) or ECC (error correcting codes) could be added to the interface by adding additional words to each data block transfer. For example, instead of the current 512 bytes, each block transferred could consist of 516 bytes, the additional 4 bytes providing CRC information for the transferred block. Such a system would provide excellent error detection, but is not acceptable due to compatibility problems. For example, legacy hardware and host firmware are hard-wired with the knowledge that DMA data transfers involve the transfer of 512 bytes. Changing that number to 516 bytes would require hardware and firmware changes (e.g. system BIOS), which would be untenable given the installed base of millions of legacy systems that would need to be modified.

In contrast to these two alternatives, the error detection/correction method of the present invention introduces no additional data words to the fast data transfer protocol set out above. Additionally, the error detection feature of the present invention can be used directly in legacy systems without any hardware or firmware changes. These benefits flow from the following two core strategies employed by the present error detection feature:

1. identify a time slot in the bus protocol (shown in FIG. 4) when a parity word can be placed on the data bus without affecting legacy systems; and
2. in that time slot, the sender (either the host or device) transmits a send error detection/correction word, i.e., a parity word, to the receiver, which compares the send parity word to an internally-maintained receive parity word maintained by the receiver that represents the sum (or other function) of the data words received by the receiver, any difference between the send and receive parity words indicating that a data transmission error has occurred.

For the purposes of this document, the term "parity word" is meant to include all types of error detection and error correction code words, including a simple parity bit, checksum, cyclic redundancy check (CRC) and error correction code (ECC). Any of these terms, when used, is meant to be synonymous with the others, except where error correction is specifically addressed.

The error detection feature outlined above, through the following extensions, also provides an error correction feature, which allows a data transfer error to be corrected by the receiver without the need to resend an entire data block:

3. allow the host 110 to identify a data block transfer length after which the sender will always compute and transmit a parity sum on the words placed on the data bus; and 4. after each data block transfer of the length defined by the host, place an error correction code (ECC) on the data bus 103 instead of a detection only code (CRC).

In a further extension of the error detection/correction method of the present invention, the parity words are passed directly to the disk buffer and subsequently to the disk to provide full pass through error checking.

Before setting out the details of the present invention's error correcting feature, various preferred embodiments/modes of the error detection feature of the present invention are discussed below.

Error Detection—Preferred Embodiments

Figure 4:
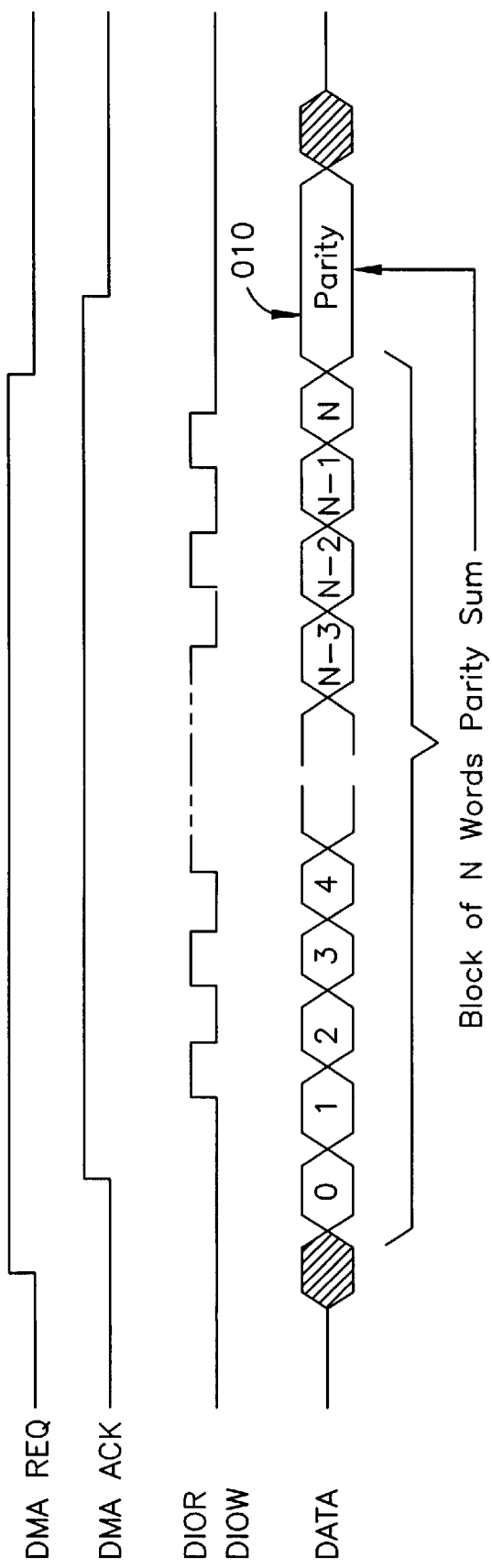
FIG. 4 is a timing diagram showing operation of the fast ATA-compatible interface at a 40 MB/sec data transfer rate with full-block data integrity checking.
Figure 7:
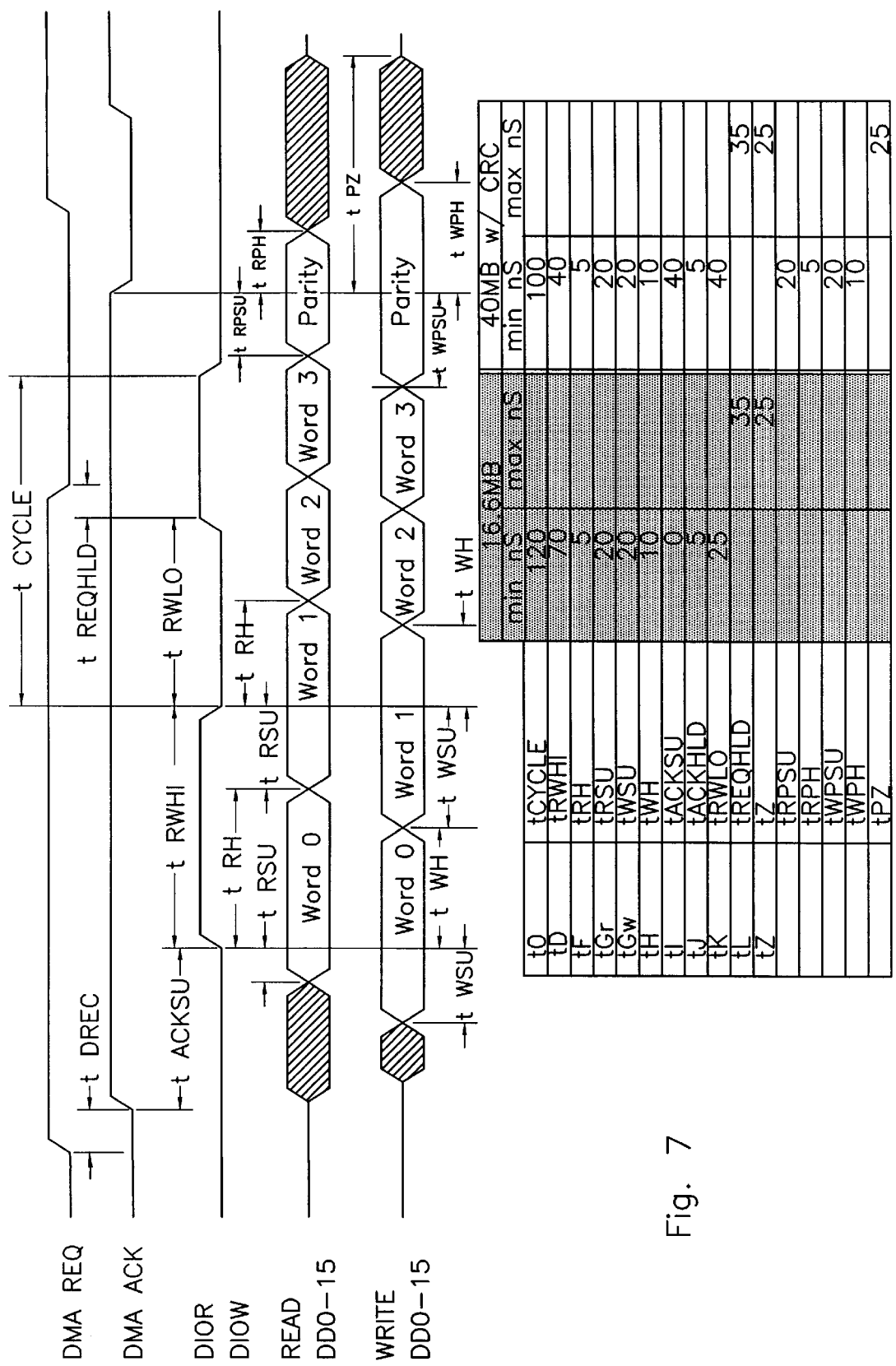
FIG. 7 is a timing diagram and table showing operation of the fast ATA-compatible interface at a 40 MB/sec data transfer rate with data integrity checking.

1. Error Detection—Full block transfers:

Referring to FIG. 4, there is shown the basic error detection method of the present invention. In this method, the sender accumulates each data word (e.g., Word_0, Word_1, etc.) placed on the bus into a send checksum word, and the receiver accumulates each word it receives from the data bus 103 into a receive checksum word. Immediately after the last (i.e., 256th) word is placed on the data lines 128 by the sender, the device 104 deasserts the DMA REQ signal on the DMA request line 122 and the last high to low transition of the DIOR-DIOW strobe on line 126 occurs, which triggers the receiver to input and internally accumulate the last data word in the data block being transferred. One significant change over the previously discussed protocol is that, after removing the last data word from the data lines 128, the sender places the final version of the send checksum (denoted as "parity" in FIG. 4) onto the data lines 128. The receiver inputs the parity word from the data lines 128 when the host deasserts the DMA ACK signal 124. To ensure that the send parity word is stable before being input by the receiver and is available on the data lines for a sufficient time after DMA ACK is dropped, the error detection/correction protocol introduces a receive parity set up time (tRPSU) of 20 ns and a receive parity hold time (tRPH) of 5 ns. Consequently, in the context of error correction/detection, tACKSU is inapplicable. These are the only changes to the timing of the fast data transfer protocol shown in FIG. 3. The detailed timing of the fast data transfer protocol with error correction/detection is illustrated in FIG. 7 and is summarized and compared to the prior art data transfer protocol in the accompanying Table 7. As with the non-error detecting data transfer protocol, when the DMA ACK signal is deasserted, the device removes itself from the data lines 128.

If the send checksum/parity word is not identical to the receive checksum/parity word, the receiver knows that a data transmission error has occurred. As this error detection technique will not allow any error correction, the sender will need to be instructed to resend the entire data block again. This form of error detection is completely compatible with ATA data transfer protocol used by legacy systems as the timing, shown in FIG. 4, does not materially differ from the old timing shown in FIG. 2. Moreover, the receiving end may simply ignore the send checksum word, which is placed on the data lines 128 after the last DIOR-DIOW edge, which normally would mark the last data word to be transferred. In fact, legacy systems do not even have to change their timing, meaning they may end the data transfer immediately after the last word is transferred by deasserting the DMA ACK signal.

2. Device Throttled Detect-Only Transfers:

Under the ATA standard, the device 104 may suspend a data transfer at any time by deasserting the DMA REQ signal according to established network timing protocols. The device 104 can subsequently reinitiate the suspended transfer by reasserting the DMA REQ signal. Such a capability is required for situations when the device 104 cannot input data as fast as the host 110 can provide it, which is often the case when a disk drive device 104 is being written to by a memory 130 via a fast host 110 and, similarly, when the device cannot supply data fast enough when reading.

Figure 5:
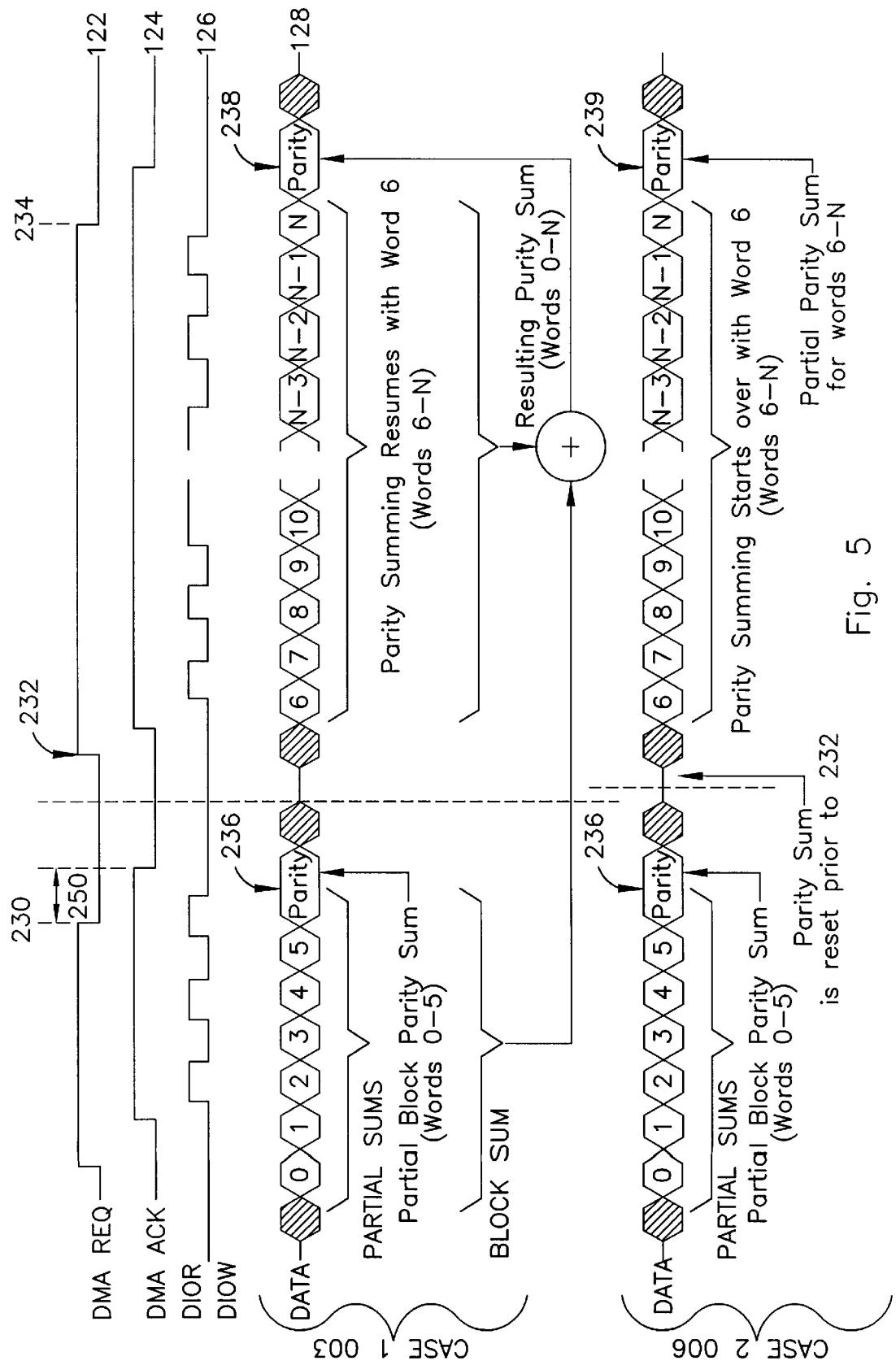
FIG. 5 is a timing diagram showing operation of the fast ATA-compatible interface at a 40 MB/sec data transfer rate with data integrity checking in the situation where a data transfer is suspended by a peripheral device.

FIG. 5 is a timing diagram illustrating two different approaches provided by the present invention to error detection following the termination of a data transfer by the device 104. Both of the approaches are similar to the basic error detection protocol outlined above in that the sender and receiver accumulate different checksums during the course of a data transfer and, upon the termination of the data transfer (indicated by the device 104 deasserting the DMA REQ signal), the sender transmits the send checksum to the receiver, which then verifies the integrity of the terminated data transfer by comparing the two checksums.

However, the situation shown in FIG. 5 differs from that shown in FIG. 4 as in FIG. 5, the sender places a partial send checksum on the data lines 128 before the entire data transfer has been completed; i.e., before all 256 words of a data block have been transferred. As a result, instead of transmitting a single checksum, the sender transmits a partial checksum each time the data transfer is interrupted. These interruptions could occur any number of times, even after every data word. For example, FIG. 5 shows a case where the data transfer of all N data words in the data block is suspended once by the device 104, as shown by the DMA REQ signal being deasserted twice at edges 230 and 234 (the second deassertion being the end of the transfer).

Following the edge 230, the sender places the partial checksum 236 on the data lines 128 so that the partial checksum can be received by the receiver upon the host's deassertion of the DMA ACK signal. The partial checksum 236 represents an accumulation of the first 6 data words (0–5) placed on the data lines 128 before the transfer's suspension.

Consequently, when the device 104 resumes the data transfer by reasserting the DMA REQ signal, as at edge 232, and the sender and receiver begin again to accumulate a checksum reflecting the integrity of the resumed data transfer, there are two possible places for the sender and receiver to resume accumulating the send and receive checksums.

One approach is shown in FIG. 5, labelled case1 003, where the checksums are not reset after each suspension of the data transfer, but are retained throughout the data transfer so that, when the entire data block has been transferred, the last send and receive checksums 238 accumulated by the sender and receiver, respectively, represent the data integrity of the entire process. Of course, in this approach, because the partial checksums are sent after every suspension, it is still possible to determine in which segments of the data transfer transmission errors occurred.

A second approach is also shown in FIG. 5, labelled case2 006, where the checksums represent the accumulation of only those data words transmitted during one interrupted portion of the entire data transfer. That is, after the data transfer is resumed, the checksums are reset to zero. Thus, in FIG. 5, the last checksum 239 is the partial parity sum for the words 6–9.

Figure 6:
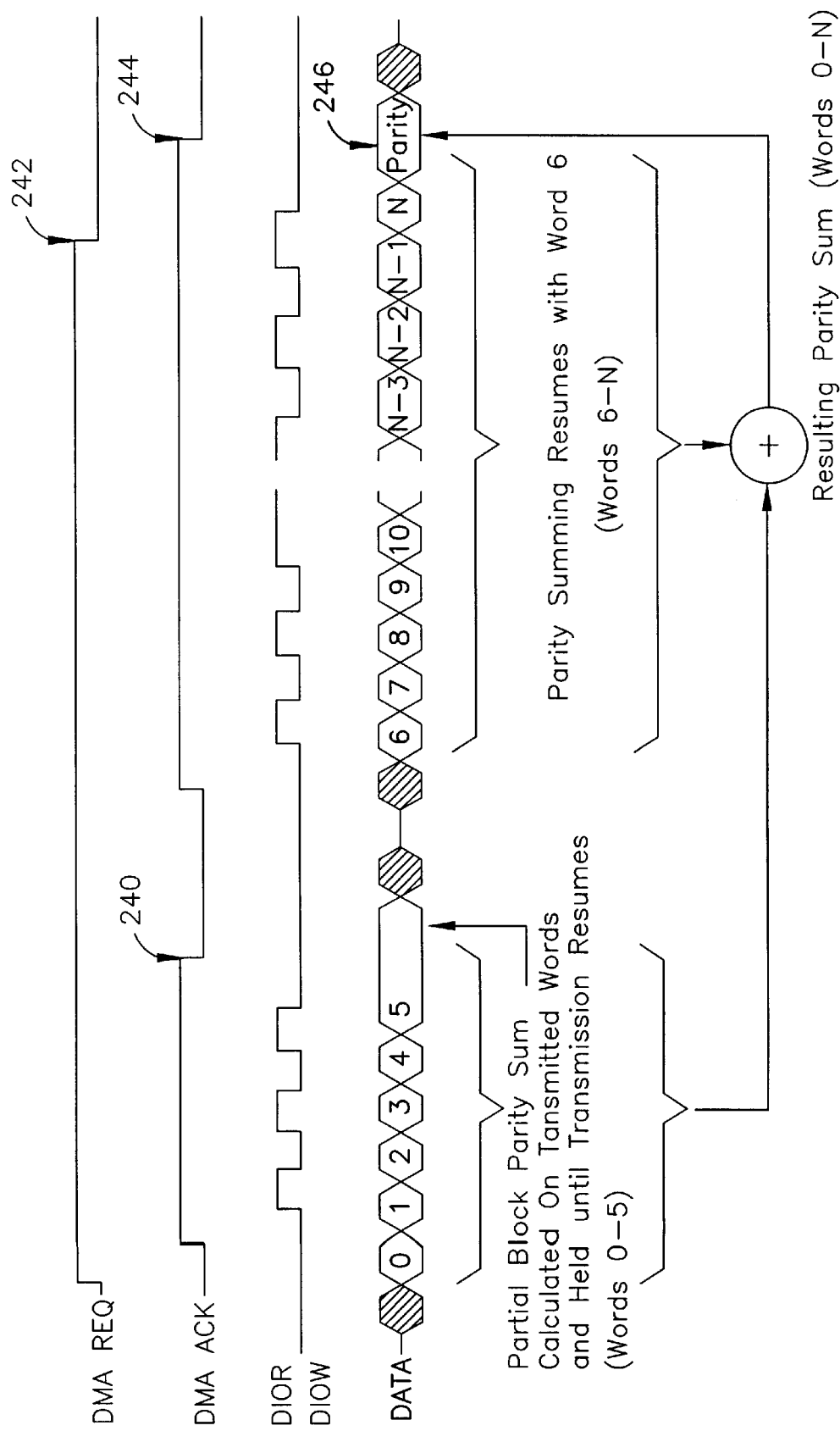
FIG. 6 is a timing diagram showing operation of the fast ATA-compatible interface at a 40 MB/sec data transfer rate with data integrity checking in the situation where a data transfer is suspended by the host.

3. Host-Throttled Detect Only Transfers:

The host may also suspend (throttle) data transfers for the same reasons as the device. Referring to FIG. 6, there is shown a timing diagram illustrating how the data transfer protocol of the present invention provides error detection in the case of host suspended data transfers. The host temporarily suspends a data transfer by deasserting the DMA ACK signal, as at edge 240 and, regardless of the state of the DMA REQ signal, the data lines 128 are relinquished by the device 104. As the DMA ACK signal edge 240 is used by the host to temporarily suspend the data transfer, after which the sender cannot place its partial checksum on the data lines 128, the sender and receiver must simply retain the partial send and receive parity words and wait for the host to resume the data transfer, at which time the sender and receiver begin accumulating the parity word from where they left off. For example, in the case shown in FIG. 6, the sender and receiver compute a parity word from the first six data words (words 0–5), after which the host suspends the data transfer. When the host resumes the data transfer, the sender and receiver resume computing the data transfer from the seventh word (word 6). When the data transfer is finished, indicated by the device deasserting the DMA REQ signal as at edge 242, the sender transmits a total send parity word 246, which represents all of the data words placed on the data lines 128.

4. Negotiated Block Transfer Count Throttling

The host 110 and the device 104 also have the ability cooperatively to suspend a data transfer. In this situation, the basic protocols discussed above in reference to FIGS. 5 and 6 are still applicable. That is, as illustrated in FIG. 6, when the host 110 suspends a block data transfer, no checksum will be presented by the sender until the entire data block has been transferred. As illustrated in FIG. 5, when the device 104 suspends the data transfer, there is a time period 250 while the DMA REQ signal is low but the DMA ACK signal is high. This time period 250 represents a slot in the ATA protocol when the sender can present the checksum without any fear of contention for the data lines 128. Also applicable is the ATA protocol rule that the host 110 must deassert the DMA ACK signal before the device can reassert the DMA REQ signal.

Within this framework, the present invention provides an additional transfer mode called negotiated block transfer count throttling, where the host controls when data transfers are terminated, but, unlike the host-throttled case shown in FIG. 6, checksums/parity can be sent after each data suspension. This mode is necessary to allow incremental error detection and/or correction of each data transfer.

To initiate a negotiated block transfer, the host 110 sends a negotiated block count to the device 104 using the "Set Features" command provided by the ATA interface standard. This negotiated block count (NBC) determines how often the device 104 will throttle a data transfer by deasserting the DMA REQ signal. After each of the host-directed data transfer suspensions, as in any device-throttled situation transfer, the sender places a checksum/parity/ECC/CRC (computed according to either of the approaches discussed above in reference to FIG. 6) on the data lines 128. What results then is a host controlled data transfer suspension where partial checksums are available on the data lines 128.

For example, to have a checksum generated and checked every 16 words, the host 100 sends a negotiated block count of 16 to the device 104 over the data lines 128. Then, once the data transfer is underway, the device 104 will deassert the DMA REQ signal after every 16th word according to the protocol set out in FIG. 5. The host responds as shown in FIG. 5. In the event that either the device 104 or the host 110 needs to suspend a transfer at times other than the 16th transfer, hey may still do so, and the checksum will be valid according to the hrottling modes discussed above in reference to FIGS. 5 and 6.

Error Correction

Preferred embodiments of the present invention provide two types of error correction. The first type of error correction relies on the independent generation and comparison of parity words (i.e., ECCs). This type of error correction is completely compatible with the four error detection modes described above, except, instead of computing and comparing a parity word (simple even/odd parity), a checksum (sum or XOR of the data words) or CRC, the sender and receiver use error correcting codes (ECCs). While it is well known in the prior art how to compute ECCs, the present invention's use of ECCs to correct data transferred across an ATA interface is not known. In this error correction mode, after inputting the sender's ECC and determining that it differs from its receive ECC, the receiver determines from the difference in the two ECCs which word of the most recently transferred data block was erroneously transmitted and generates a correction mask to correct the erroneously transmitted word. Of course, for error correction to be effective, the number of words in a block multiplied by the probability of a transmission error at the highest data transfer rates should not exceed the power of the ECC; i.e., the ECC should be able to correct the number of transmission errors likely to occur during the transmission of a data block.

As the data transfer protocol of the present invention allows only one 16-bit error detection/correction word (e.g., Reed-Solomon block code of the type widely used in the industry), the number of words transferred per block must be limited. In fact, for optimum error correction, the ECC should be transmitted after every four data words. The negotiated block count transfer mode of the present invention best supports this kind of limited, regularly throttled data transfer. Of course, performing error correction after every fourth data word adds overhead; in this case, reducing the data transfer rate from 40 MB/sec to approximately 27 MB/sec. However, this transfer rate is still significantly faster than that provided by the prior art interface (16.6 MB/sec), which provides neither data integrity checking nor error correction. A block code could also support more than four words, and other types of codes may support several times that amount, thereby increasing bandwidth efficiency at the expense of more complicated logic.

In addition to error correction via ECC, other preferred embodiments of the present invention adopt an error prevention approach that focusses on making the interface and the signals transferred over the interface less prone to transmission error. In one preferred embodiment, the electrical characteristic of the signals are modified by changing the slew rate (the time for the signal to change from one state to another state; e.g., a low to a high voltage) of signals on the data lines 128 from 5 ns to 10 ns. This change reduces noise and results in better transmission line characteristics without adding overhead to data transfers (in the present fast data transfer protocol, in a 100 ns cycle, the two data words need only to be available for 25–30 ns, leaving another 20–25 ns for signal transitions). Another preferred embodiment reduces the voltage swing from 0–5 volts to 0–3.5 volts, which is still TTL compatible (TTL switches low at 0.8 volts and high at 2.4 volts), yet again, reduces signal noise. These two approaches can be used independently or together, to yield the best error prevention results. Another preferred embodiment adjusts the center switching threshold voltage level on input receivers to about 1.4 volts. Again, this change is compatible with TTL switching characteristics, yet significantly reduces signal noise by increasing noise immunity in the input receivers. Yet another preferred embodiment adds series terminating resistors at the driving end of the host 110 for output cable impedance matching purposes, which limits ringing in output data signals. However, as the resistors will reduce output voltage level, this preferred embodiment should not be used in conjunction with the other three, which provide signals with less spare signal level.

Options for Checksum Resetting

In an extension of the parity checking described above, where the sender sends a parity word accumulated over the most recent block of data or an entire transfer, the present invention also allows the sender to accumulate checksums over whole blocks, multiples of blocks or continuously. As long as the sender and receiver of data accumulate, send and check data according to the same protocol, the user may select any mode of error checking/detection desired.

DEVICE INTERFACE CIRCUITRY

The previous discussion has been directed to the methods by which the present invention achieves reliable, 40 MB/sec transfers over an ATA compatible interface. The following discussions set out the host and disk interface circuitry that implement those methods. As interface circuitry in the host and the device are symmetrical (i.e., write/read circuitry in the host mirrors read/write circuitry in the device), only the device circuity is discussed herein. However, all novel aspects of the interface circuitry of the present invention also apply to the host side.

Prior Art

Figure 8:
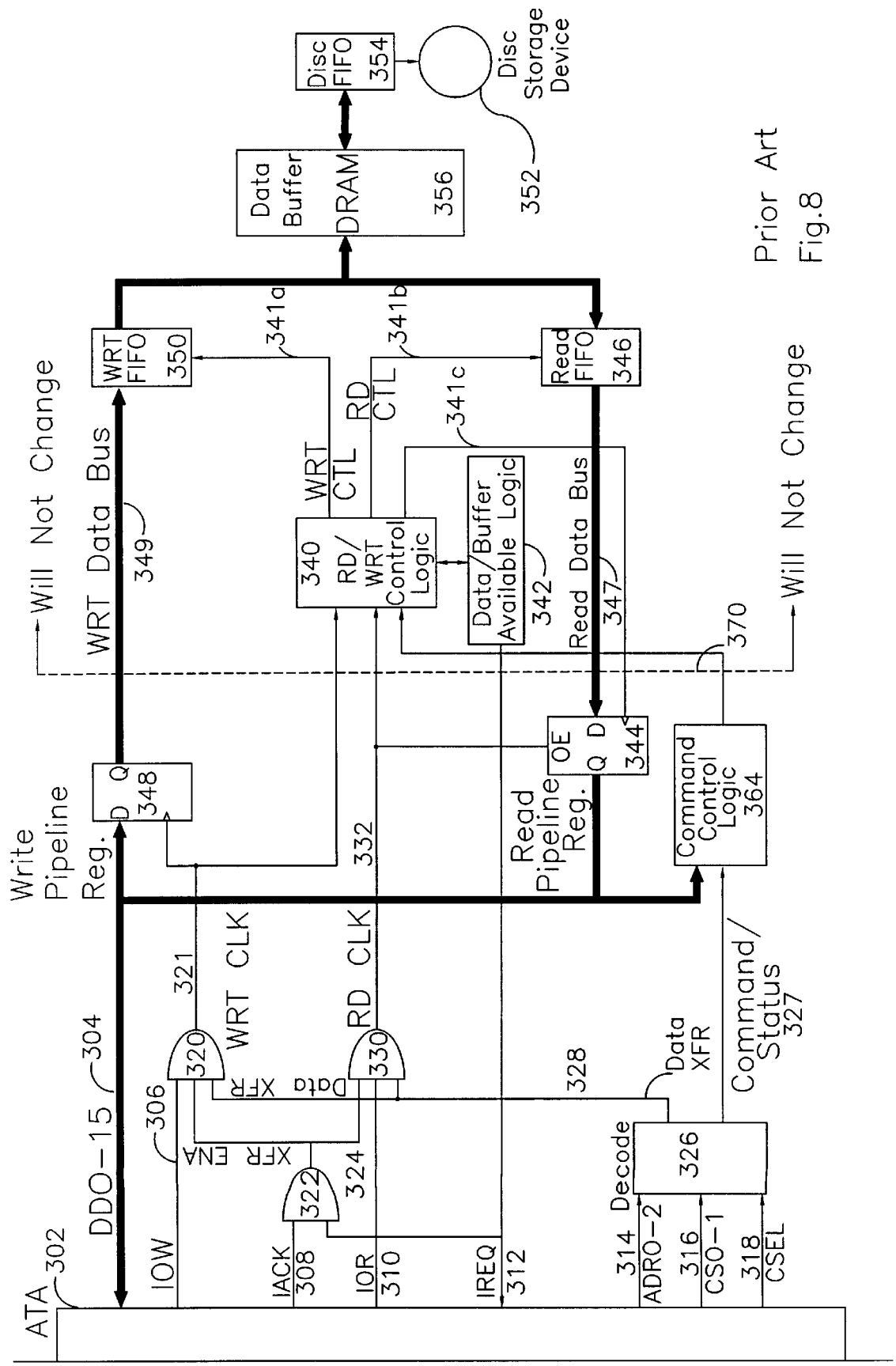
FIG. 8 is a block diagram of prior art device interface circuitry.

Referring to FIG. 8, there is shown the typical ATA drive interface circuitry provided by the prior art. The connector 302 is the interface between the device/drive 104 and the interface bus 103. Therefore, everything to the left of the connector 302 (please refer to FIG. 1) is on the host side of the interface and everything to the right of the connector 302 is on the device side of the interface. The right side of the connector 302 is tied to the device's internal I/O lines, which include an internal, 16-bit data bus 304, an I/O write strobe (IOW) line 306, an internal DMA REQ line 308 (IREQ), an I/O read strobe (IOR) line 310, an internal DMA ACK line 312 (IACK), and I/O command lines 314–318, including device address lines (ADR0-2), command/status lines (CS0-1) and a device select line (CSEL). These internal lines are directly tied by the connector 302 to the lines of the interface bus 103 as follows:

| internal I/O lines | | data bus lines | |
|---|---|---|---|
| IREQ | 308 | DMA REQ | 122 |
| IACK | 308 | DMA ACK | 124 |
| IOW | 306 | DIOW | 126 |
| IOR | 310 | DIOR | 126 |
| ID0-15 | 304 | DD0-15 | 128 |

Thus, the signals on the internal data lines 304, IOW line 306, IOR line 310, IACK line 308, and IREQ line 312 correspond to the signals on the external data lines 128, the DIOW write and DIOR read strobe lines 126, and the DMA ACK 124 and DMA REQ 122 lines, respectively. The signals on the control lines 314–318 correspond to device addressing and selection placed by the host 110 on the external bus lines 103. Consequently, the following descriptions do not refer to the connector nor to distinctions between internal and external signals; nor is a distinction made between lines and the signals on those lines. For example, a description might refer to the IOW line 306, or the IOW signal 306, the latter of which is shorthand meaning the signal on the IOW line 306. Generally, in FIGS. 8–11, all circuit elements to the left of the vertical dashed line 170 are within the AT interface block 109 in FIG. 1A, the disc FIFO 354 and the data buffer 356 are within the disc interface 108 and the remaining elements to the right of the line 170 (e.g., read and write FIFOs 346, 350, read/write control logic 340 and data buffer available logic 342) are included in the buffer memory interface 116. The disc storage device 352 corresponds to the disc storage device 105.

As set out above, there are two basic operations provided by the ATA interface, host reads and host writes. Generally, a host read consists of the following steps:

1. the host 110 sends read command to device 104;
2. decoder 326 decodes the read command;
3. if the data buffer 356 is available for reading, the device asserts the IREQ signal 312 (corresponding to the external DMA REQ signal 122);
4. if ready, the host asserts the DMA ACK signal 124 (corresponding to the internal IACK signal 308);
5. host asserts the DIOR read strobe 306 (corresponding to the internal IOR signal 310);
6. a minimum setup time before every high to low transition of the DIOR signal, the device outputs a data word from the read pipeline register 344 onto the data lines 304 (corresponding to the external data lines 128);
7. the read pipeline register 344 is kept supplied over the read data bus 347 by the read FIFO 346, which stores a small number of data words (typically 16 words) received from the data buffer 356 under control of the read/write control logic 340, which arbitrates access to the data buffer 356 by the FIFOs 350, 346, 354, the data buffer 356 and the disc FIFO 354 defining the only memory path to and from the disk channel 352 from the data bus 304;
8. when the data transfer (or block) is finished, the device deasserts the IREQ signal, and the host deasserts the DIOR read data strobe 126 and the DMA ACK signal 124.

The prior art device interface circuitry that implements these steps is described in greater detail below. As only that part of the device interface circuitry shown to the left of the dashed line 370 is modified by the present invention, the following discussions will focus on only-that part of the prior art circuitry. Timing of the signals and transitions discussed below are as shown in FIG. 2.

As the first step in a host read operation, the host 110 places the read command, which consists of a 16-bit command word on the data bus 304, 3-bit address field (the bus address of the Task File Register 109 device), 2 device-specific control bits and a device select bit (enabling the decoder 326). The command word passes through the connector 302 and is supplied to the Command Control Logic 364 via the data lines 304. The decoder 326, upon determining that the data transfer command is directed to the device 104, asserts the DATA_XFR signal 328, which remains asserted for as long as the data transfer is underway. If the data buffer available logic 342 determines that the data buffer 356 is available for read data supplied by the disc FIFO 354, and supplied to the Read FIFO 346, it asserts the IREQ signal 312 (corresponding to the DMA REQ signal on the line 122). When the host 110 decides to grant the request, it asserts the DMA ACK signal 124 (corresponding to the IACK signal 308). In both the prior art and the new data transfer protocols of the present invention, a data transfer is enabled only when both the IACK and IREQ signals are asserted. Consequently, the IACK 308 and IREQ 312 signals are ANDed together in the AND gate 322 to generate a transfer enable (XFR ENA) signal 324.

Next, according to the timing diagram of FIG. 2, the host 110 activates the DIOR read strobe 126, which remains active until the word read is finished or otherwise terminated by the host 110. The read strobe signal 126 (or IOR signal 310) is ANDed in the AND gate 330 with the XFR ENA and DATA XFR signals, resulting in a read clock (RDCLK) signal 332 with a period identical to that of the DIOR strobe 126 that is active as long as both IACK 308 and IREQ 312 are asserted. The RDCLK signal 332 is input to the read/write control logic 340, which performs various I/O control function, including data buffer 356 arbitration between the write and read FIFOs, and the output enable (OE) pin of the read pipeline register 344, which as a result, can only output data to the data lines 304 when the RDCLK signal is high. This prior art implementation, where the data bus is enabled for output only when the RDCLK signal 332 is high, is the main cause of the wasted bandwidth discussed above. However, this has little bearing on the prior art, as a new data word is clocked out of the read pipeline register 344 only upon a low to high transition of the readout signal 341c, which occurs a negligible or short time after the rising edge of the RDCLK signal 332. Consequently, the data lines 304 are enabled for reading by the host 110 only when the IOR signal 310 is asserted and new data words are available on the data lines 304 in time for the falling edge of the DIOR strobe signal, which is when the host 110 receives the data word.

A host write operation to the device is similar to the read described above, except that the IOW signal 306, AND gate 320, write pipeline register 348, write FIFO 350 and wrt data bus 362 substitute for the IOR signal 310, AND gate 330, read pipeline register 344, read FIFO 346 and read data bus 360. Generally, a host write consists of the following steps:

1. host 110 sends write command to device 104;
2. decoder 326 decodes the write command;
3. if the data buffer 356 is available for writing, the device 104 asserts the IREQ signal 312 (corresponding to the external DMA REQ signal 122);
4. if ready, the host asserts the DMA ACK signal 124 (corresponding to the internal IACK signal 308);
5. host asserts the DIOW read strobe 306 (corresponding to the internal IOR signal 310);
6. on every high to low transition of the DIOW signal, the write pipeline register 348 strobes a data word placed by the host on the data lines 304 (corresponding to the external data lines 128) onto the write data bus 362 and into the write FIFO 350;
7. the data buffer 356 is kept supplied by the write FIFO 350, which stores a small number of data words (typically 16 words) received over the write data bus 362 from the write pipeline register 348, under control of the read/write control logic 340, which arbitrates access to the data buffer 356 by the FIFOs 350, 346, 354, the data buffer 356 and the disc FIFO 354 defining the only path to and from the disk channel 352 from the data bus 304;
8. when the data transfer is finished, the device deasserts the IREQ signal, and the host deasserts the DIOR read data strobe 126 and the DMA ACK signal 124.

Fast ATA-compatible transfer circuitry

Figure 9:
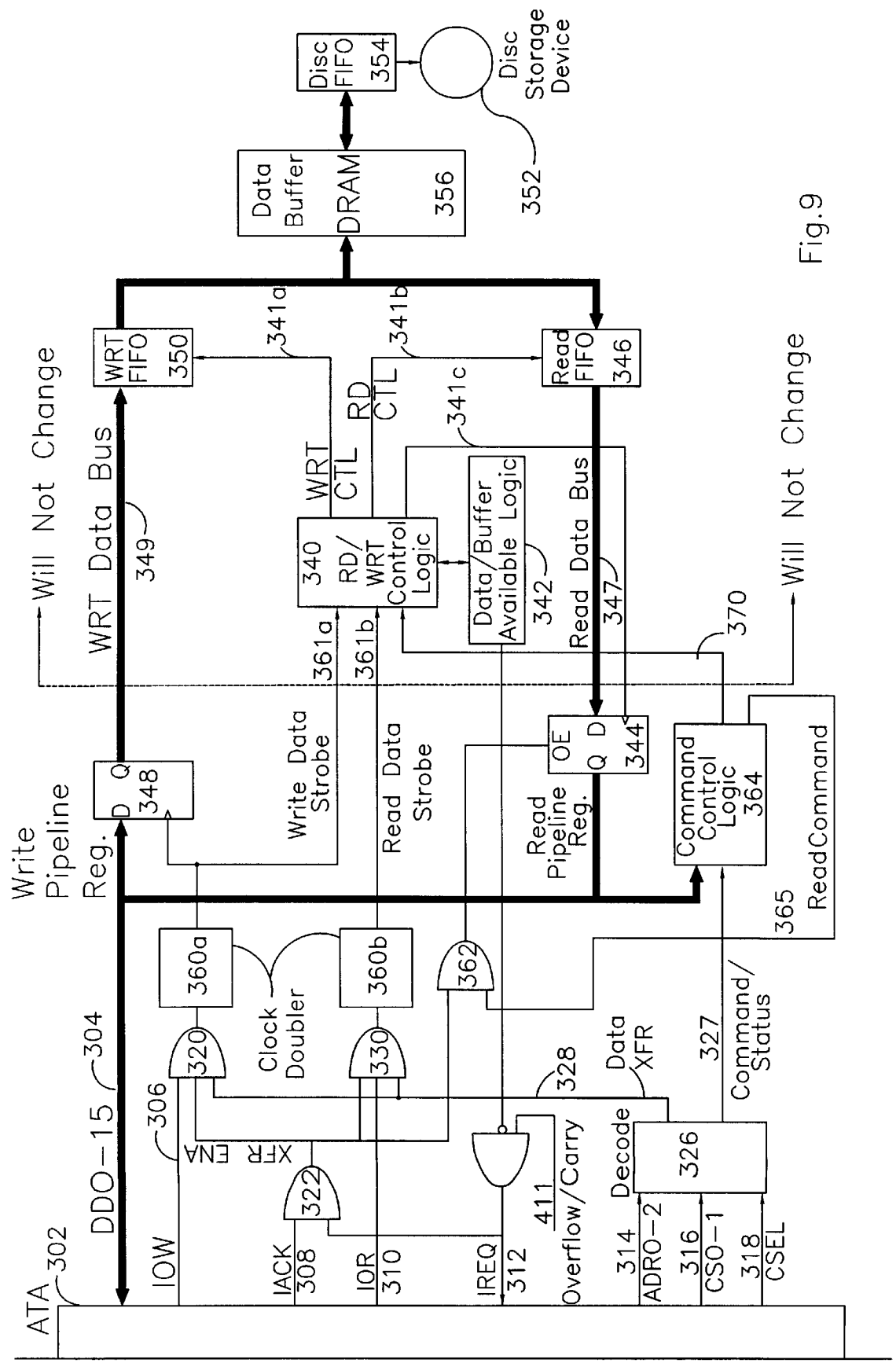
FIG. 9 is a block diagram of the fast device interface circuitry of the present invention.

Referring to FIG. 9, there is shown the device interface circuitry of the present invention, which is based on the prior art circuitry shown in FIG. 8. Components added to the prior art circuitry include two clock doublers 360a and 360b, the inputs of which are tied to the outputs of the AND gates 320 and 330, the output of the clock doubler 360*a* being tied to the write pipeline register 348 and the read write control logic 340, and the output of the clock doubler 360*b* being tied to the read write control logic 340. Another new circuit element provided by the present invention is a new signal from the command control logic 364, which receives a command/status signal 327 from the first decoder 326 and data/commands from the internal data bus 304 and outputs a read command 365 to an, also new, enabling AND gate 362. The enabling AND gate 362 also receives the XFR ENA signal from the AND gate 330 and outputs an output enable signal 363 to the output enable (OE) pin of the read pipeline register 344. These new components are all within the AT interface 109 in FIG. 1A.

These additional elements allow the fast interface of the present invention to function as illustrated in FIG. 3. Namely, these elements enable the following features of the present invention:

1. maintaining the bus in an enabled state throughout the entire data transfer operation instead of disabling the bus between each transmitted word as shown in FIG. 2; and
2. transferring a data word on every edge of the data strobes DIOR and DIOW.

The first feature is provided by the enabling AND gate 362 and the command control logic 364. As described above in reference to FIG. 8, in the prior art, the data bus output 304 of the read pipeline register 344 is only enabled as long as the RDCLK signal 332 is asserted, which is whenever each of the XFR ENA, DATA XFR and periodic IOR strobe are asserted. This results in the wasted data bus bandwidth discussed above in reference to FIG. 2. To eliminate this wasted bandwidth, the enabling AND gate 362 of present invention provides an output enable signal 363 which, as long as the XFR ENA signal 324 and the read command signal 365 from the command control logic 364 are asserted, which results in the data bus output always being enabled. The command control logic 364 asserts the read command signal upon 1) the assertion of the command/status signal 327 by the first decoder 326, which indicates that the command currently on the data lines 128 is for the device 104, and 2) determining, by application of its decoding function, that the command on the data lines 128 is a host read of the device. The command control logic 364 then latches the asserted read command signal 365 until all the words of the data transfer are transferred; i.e., the read command signal 365 remains latched even if the host or device throttles the transfer. Of course, if the host or device throttles the transfer, one or both of the IACK or IREQ signals will be deasserted, which will cause the output enable signal on the read pipeline register 344 to drop; however, when the read command signal 365 is asserted, as soon as the data transfer is resumed, the read pipeline register is enabled for output.

The second feature is provided by the clock doubling circuits 360*a* and 360*b*, which generate, respectively, a write data strobe 361*a* and a read data strobe 361*b* whose periodic frequency is twice that of the periodic WRTCLK 321 and RDCLK 322 signals input to those clock doubling circuits. The write data strobe 361*a* is supplied to the write pipeline register 348 and the read/write control logic 340. The read data strobe 361*b* is also input to the read/write control logic 340. As set out above, in the prior art, for every low to high pulse of the read data strobe, the read control logic 340 sends a read control pulse 341*b* to the read FIFO 346, causing a data word to be output onto the READ DATA BUS 347, and a clock pulse 341*c* to the read pipeline register 344, which causes the data word on the read data bus 347 to be output to the data lines 304. A symmetrical sequence takes place when the data transfer is a write instead of a read except that, in the write case, the write pipeline register 348, write data bus 349 and write FIFO 350 are involved instead of the read pipeline register 344, read data bus 347 and read FIFO 346.

By providing the clock doubling circuits 360*a*, 360*b*, the present invention leaves the above described prior art operation essentially undisturbed, except that the falling edges of the write and read data strobes 361*a* and 361*b* occur twice as often as in the prior art. That is, in the present invention, a falling edge of the read and write data strobes corresponds to a rising or falling transition of the IOR and IOW signals, respectively. Consequently, in the present invention, the read/write control logic 340 causes to be output (host read) or input (host write) a new data word for each edge of the IOR or IOW signals.

As the clock doubling circuits 360 employed by the present invention are well known in the prior art, they are not further described herein.

In addition to clock doubling circuits, the present invention encompasses other means for sending and receiving data words on both edges of the read and write data strobes. For example, the same operation can be obtained using a widely-known circuit including two DQ registers, an inverter that inverts the strobe, the inverted output of which is tied to one of the registers, and a multiplexer coupled to the outputs of the registers with a select tied to the strobe. In such a circuit, alternate words are selected by the multiplexer from the different registers, which output a word on alternate edges of the strobe.

Fast ATA-compatible circuitry with error detection only

Figure 10:
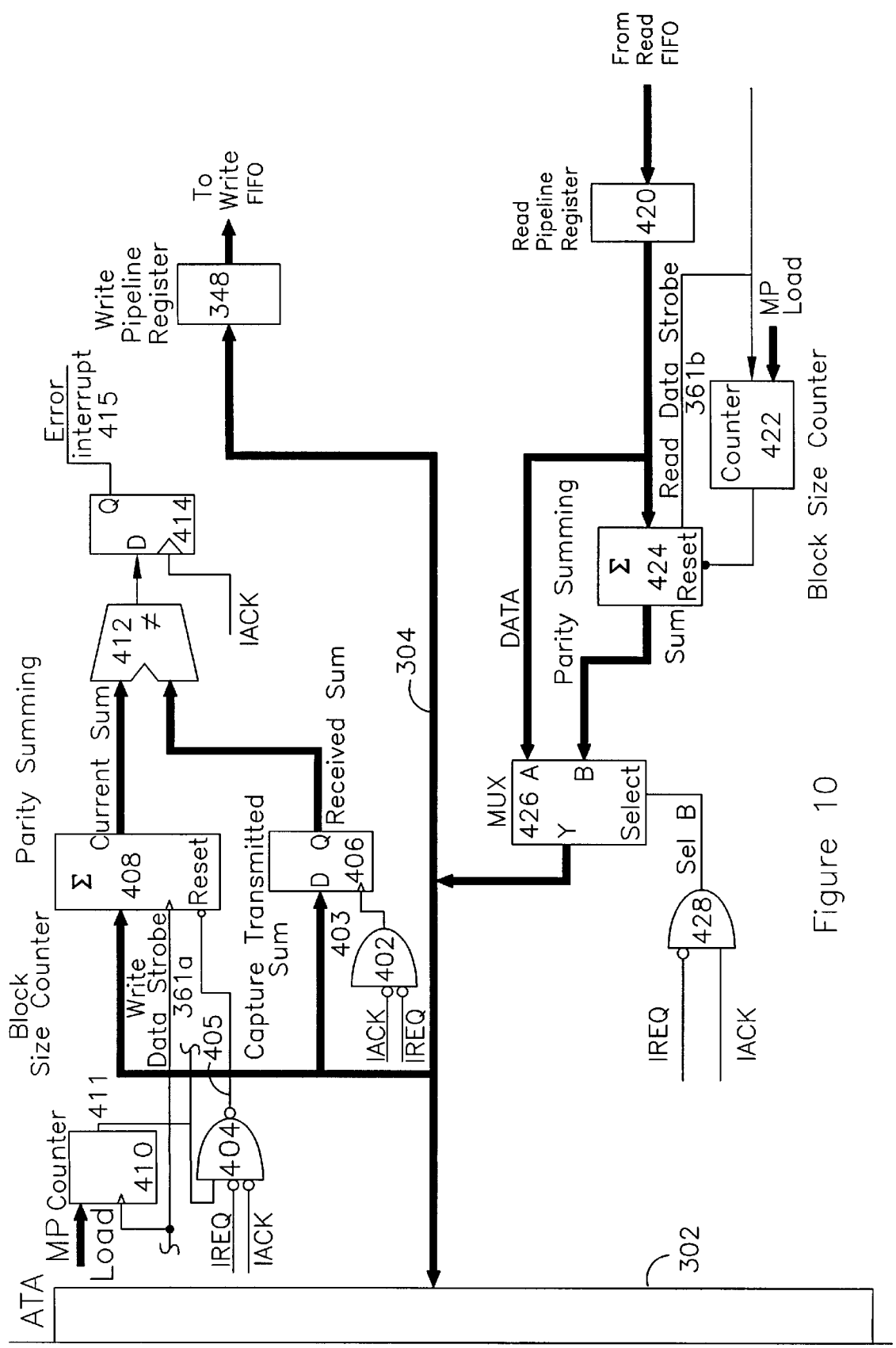
FIG. 10 is a block diagram of the device error detection and interface circuitry of the present invention.

Referring to FIG. 10, there is shown the interface circuitry of the present invention that implements the error detection feature discussed above in reference to FIGS. 4–7. This circuitry is in addition to and interacts with the circuitry shown in FIG. 9 and corresponds to the data error correction logic 401 in FIG. 1A. Consequently, like names in FIG. 9 and FIG. 10 correspond to like signals and devices. Alternatively, the error detection circuitry shown in FIG. 10 can be used in conjunction with the prior art AT interface circuitry in FIG. 8 or any other ATA-compatible interface circuitry. As the error detection/correction protocol of the present invention requires the receiving unit (either the host 110 or the device 104) to maintain an internal parity word and compare that internal parity word to the send parity word maintained and transmitted by the sender, the device's write error detection/correction circuitry is more complex than the device's read error circuitry. Consequently, the following discussion focusses on the device's write error detection interface circuitry. Operation of the host's error detection circuitry, and the device's read error detection circuitry is symmetric to and follows obviously from these descriptions.

The circuity shown in FIG. 10 provides error detection in the following four data transfer termination modes discussed above in reference to FIGS. 4–7:

1. error detection in full-sector (512byte) block transfers
2. error detection in device-throttled transfers
3. error detection in host-throttled transfers
4. error detection in negotiated block transfers The additional write error detection circuitry comprises AND gates 402, 404, a receive latch 406, an accumulator 408, a counter 410, a comparator 412 and an error latch 414. The data lines 304 are connected to the inputs of the adder 408 and the receive latch 406. The other input to the receive latch is tied the output 403 of the AND gate 402, which is asserted whenever both the DMA ACK and the DMA REQ signals are low. The other inputs to the accumulator 408 are the write data strobe 361a, falling edges of which trigger the accumulator 408 to strobe in host data from the data lines 304, and a reset signal, high to low transitions of which reset the accumulator's internal sum. The block counter 410 is initially loaded with a negotiated block count value received from the microprocessor, and repeatedly counts from zero to the block count value, outputting the count to the AND gate 404, incrementing the count 411 one every falling edge of the write data strobe 361. The AND gate 404 generates a low output (i.e, a low reset signal) whenever the count 411 is nonzero, and DMA REQ and DMA ACK are both unasserted or low. The comparator compares the two parity values supplied by the accumulator 408 and the receive latch 406 and outputs an error signal to the error latch 414 whenever the two values are not equal, On a subsequent positive edge of the DMA ACK signal, the error latch 414 sets an interrupt 415, which is handled by the host 110.

Having set out the components of the device's error detection circuitry, all that remains is to discuss how the various pieces interact to provide error detection in the various transmission modes set out above.

1. Full Block Data Transfers

In the basic case, where a full 512K block is transmitted from the host to the device without interruption, each data word placed on the data lines 304 is clocked into the accumulator 408 on each falling edge of the clock-doubled write data strobe 361a. If the accumulator 408 is performing a simple checksum data correction process, it then adds the new data word to the current running total. I.e., after N words have been transferred to the device, the current running total maintained by the accumulator 408 should equal the sum of the N words. This accumulation process continues until the data transfer is completed, at which time the write data strobe is deactivated.

In addition to the host deactivating the write data strobe, when the data transfer is finished, the device 104 deasserts the DMA REQ line, after which the host-sender 110 places the parity word (meaning parity, checksum, CRC, or ECC word) on the data lines 128 and subsequently deasserts the DMA ACK line as shown in FIG. 4. When the host deasserts the DMA ACK signal, the AND gate 402 generates a falling edge receive latch signal 403 which causes the parity word on the data lines 304 to appear at the output of the receive latch 406. The comparator 410 compares the latched send parity word to the internal receive parity word from the accumulator 408 and outputs an error signal to the error latch if the two parity words are not the same. On the next low to high transition of the DMA ACK line, the error signal appears at the outputs of the error latch 414 as a host interrupt, which indicates that a data transfer error occurred during the current data transfer. It is then up to the host to correct the error. In read transfers, the parity is similarly generated from the data provided by the read pipeline register 420, with the summing generated by the accumulator 424. The data is transferred through the multiplexer (MUX) 426 to the host as previously described in reference to FIG. 9. The parity, however, is enabled onto the bus at time 010 in FIG. 4.

In the remaining three data termination modes, the error detection circuitry operates generally as described above with a few exceptions.

2. Device Throttled Data Transfers

The main difference between error detection in device-throttled transfers and in full block transfers is that, in the device-throttled case the host-sender sends the parity word multiple times in the course of the data transfer, rather than just once, at the end of the data transfer. The protocol controlling the exchange of parity information after each termination is similar to the full block case, described above. However, as discussed in reference to FIG. 4, the present invention allows the host to specify whether the parity words in the device-throttled case will reflect only the data in a partial block transfer or all of the data transferred.

In case1 003, shown in FIG. 5, the microprocessor 114 implements full block parity checking by setting the count of the block counter 410 to the full block size, typically 256 (512 bytes). Consequently, when the DMA REQ and DMA ACK signals are deasserted after the device throttles the transfer, the reset signal 405 remains high and the accumulator 408 is not reset. This is because the count is not exhausted. As a result, when the device reinitiates the suspended data transfer, the accumulator 408 will continue accumulating parity words from where it left off. In case2 006, the microprocessor 114 implements partial block parity checking by setting the count output 411 of the block counter 410 to the desired block count, less than the full block count. In this case, when DMA REQ and DMA ACK are deasserted after the device throttles the transfer, the reset signal 405 drops low and resets the accumulator 408, which will subsequently begin accumulating parity words from 0.

3. Host Throttled Data Transfers

Recalling FIG. 6, in the host-throttled case, the host 110 removes the device 104 from the bus by dropping the DMA ACK signal and deactivating the data strobes DIOR, DIOW. However, the device does not drop the DMA REQ signal, nor does the host 110 send parity over the data lines 128. As can be seen from FIG. 10, the AND gates 402 and 404 will not generate an active output in this situation. Consequently, no error checking will be done in the host-throttled case until the last word of the block has been transferred and the DMA REQ and DMA ACK signals are deasserted as in the full block and device-throttled cases. Of course, the send and receive parity values will reflect all of the words in the data block. If the device subsequently throttles the transfer, that operation and parity checking proceeds as previously described, thereby allowing parity checking to the degree required.

4. Negotiated Block Transfers

In the negotiated block transfer case, the host 110 sends the device 104 a negotiated block length, say N, which tells the device to throttle data transfers and perform error detection/correction after every Nth transmitted word.

Negotiated block transfers are implemented by the circuitry of FIG. 10 as follows. To set up a negotiated block transfer, the host 110 loads the counter 410, which is connected to the microprocessor bus, with the negotiated block transfer length. When the data transfer is underway, for each high to low transition of the write data strobe, the counter increments its internal count value. When the internal count value matches the negotiated block transfer length, the counter 410 asserts the count signal 411, which, in the negotiated block transfer mode, is normally held low. When the overflow signal is asserted, indicating that N data words have been transmitted since the last device-throttle, two things occur. First, the device throttles the transfer by deasserting the DMA REQ line using gate 012 in FIG. 9; after which parity is exchanged between the sender (host) and the receiver (device) as in the normal device-throttled case. Second, in response to the count signal 411 transitioning low while the DMA REQ and DMA ACK are low, the AND gate 405 generates a high to low reset signal 405 that resets the accumulator 408. Consequently, when the device reasserts DMA REQ to resume the suspended data transfer, the accumulator begins accumulating from 0.

As FIG. 10 shows, even if a negotiated block transfer is underway, the device 104 or the host 110 can still throttle the data transfer as described above. For example, if the device 104 deasserts DMA REQ in the middle of a negotiated block transfer (i.e., during the transmission of an N word block), the AND gate 402 would still activate the receive strobe 403 upon the host dropping DMA ACK, as a result initiating a parity check operation in the comparator 410. However, in this case, the accumulator would not reset the parity sum as the counter signal 411 would not have been asserted by the counter, meaning that the AND gate 404 would not activate the reset signal 405. However, at some later point, once the count matches the negotiated block transfer length, the data transfer would again be suspended. Similarly, the host can throttle the transfer as before by deasserting the DMA ACK signal and deactivating the write data strobe.

Fast ATA-compatible circuitry with error correction

Figure 11:
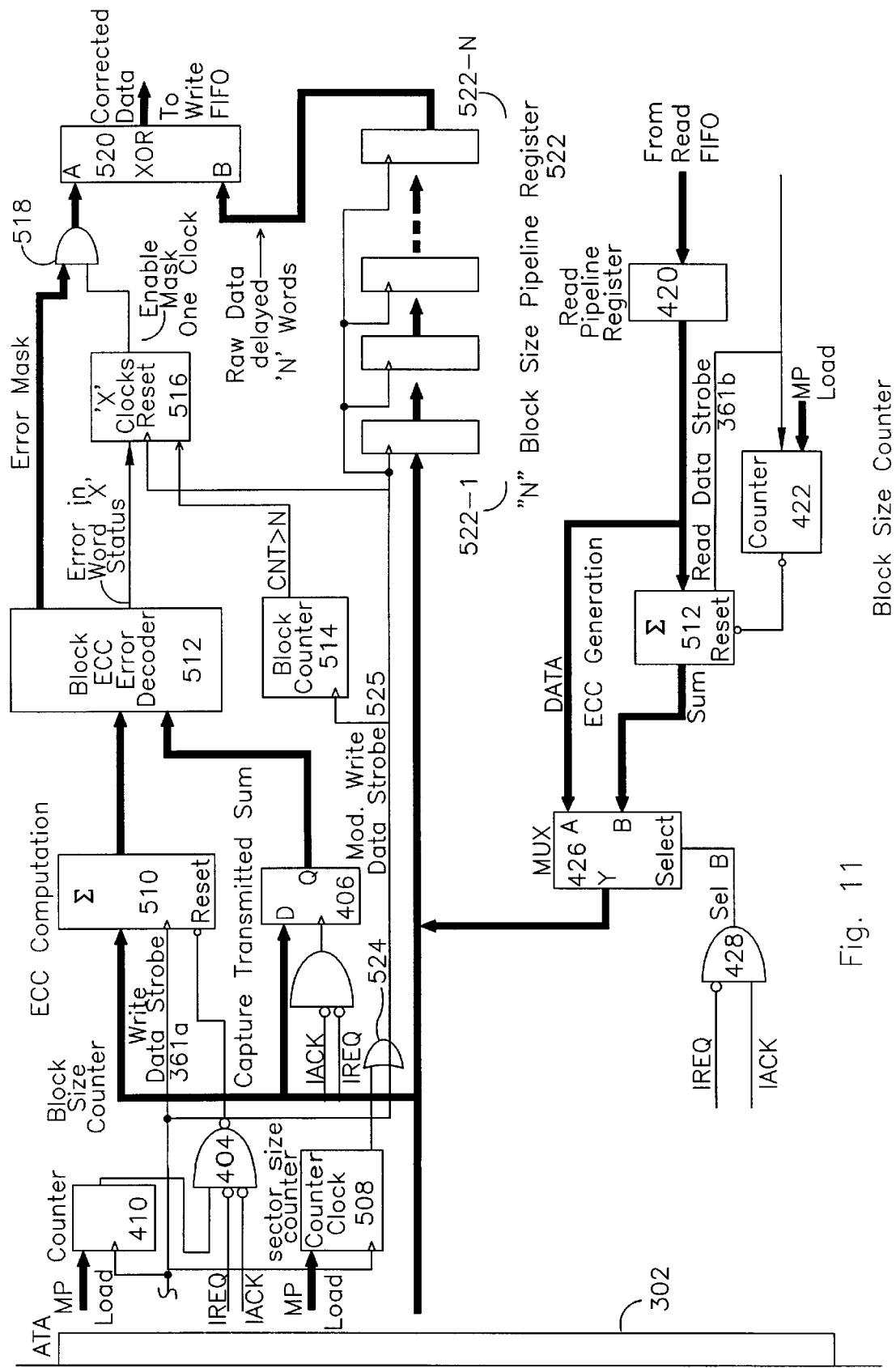
FIG. 11 is a block diagram of the device error correction and interface circuitry of the present invention.

Referring to FIG. 11, there is shown the device interface circuitry that implements the error correction feature of the present invention. The circuitry shown is largely the same as that described in reference to FIGS. 8, 9, 10 and 11. Additional elements used for write error correction include a sector size counter/clock 508, an ECC generator 510, a block ECC error decoder/state machine 512, a block counter 514, synchronizing logic 516, a two input AND gate 518, an exclusive OR (XOR) gate 520 and a pipeline register structure 522 consisting of N pipelined registers 522-1 to 522-N. The elements used for read error detection are a subset of those used for the write case and include the ECC generator 512 in lieu of the accumulator 408 used in the error detection circuitry shown in FIG. 10. These additional elements are included in the data error correction logic 401 in FIG. 1A. As with the device interface circuitry of FIG. 10, the read circuitry for error correction is simpler than the write circuitry because only the receiver (the host in a read or the device in a write) performs error detection or correction; the sender merely computes and transmits to the receiver the send parity word. Consequently, the following description will describe only the error-correcting operation of the device interface circuitry for a host write.

The operation of the device interface error correction circuitry is quite similar to the operation of the device error correction circuitry discussed in reference to FIG. 10. The main difference is that in the error correction case, the sender transmits an ECC (error correction code) to the receiver instead of a parity, checksum or CRC word. The ECC allows the receiver to correct the erroneous transmission instead of merely setting an interrupt. Otherwise, the four modes of operation described above apply here.

As with error detection, when a data transfer is in progress, the device's ECC generator (similarly to the accumulator 408 shown in FIG. 10), recomputes the receive ECC word for each received data word appearing on the data lines 304. In the preferred embodiment, the ECC words are Reed Solomon Block Codes; however, the ECC words can be computed according to any one of the well known error correction techniques, bearing in mind that, in general, there is a direct relationship between the correcting power of an ECC and data transfer overhead. In addition to being used by the ECC generator, each received data word is input to the first register 522-1 of the pipelined register structure 522, which has enough registers to hold all of the N words composing a block data transfer. With each pulse of the write data strobe, the words in the pipelined register structure 522 advance by one register position; e.g., if Word_0 is latched into the register 522-1 on the first cycle of the write data strobe, Word_0 is latched into the last register 522-N on the Nth cycle of the write data strobe; and is output to the XOR on the first clock of the next block transfer. I.e., the pipelined register structure introduces a delay of N clock periods in the data stream input supplied to the B input of the XOR gate 520. To account for the situation where the last N data words (or block) of the sector are left in the pipelined register 522 after the write data strobe has been deactivated, the sector size counter 508 generates N additional clock pulses after all of the data words of the sector have been transferred to the device 104. The clock signal from the sector counter 508 is ORed with the write data strobe in the OR gate 524 to form the modified write data strobe, which is fed to the block counter 514 and the register stages 522-1 through 522-N of the pipelined register 522. The modified write data strobe is identical to the write data strobe 361a except for the additional N clock pulses.

The ECC generator 510 stops accumulating the receive ECC word when the host 110 deactivates the write data strobe. The send ECC word, placed by the host-sender on the data lines 304, subsequently appears at the output of the receive latch 406 when the host drops the DMA ACK line. The send ECC word and the receive ECC word are then presented to the ECC state machine 512, which, if there is mismatch between the two ECCs, determines which data word (or words—depending on the size of the block and the robustness of the error correction technique) was incorrectly transmitted, and generates a correction or error mask, which, when XORed with the bad words, will correct the transmission errors. The pipelined registers 522 delay the data words' appearance at the input of the XOR gate 520 so that the ECC state machine can correct the transmission errors on the fly, before the word are written to the write FIFO 350.

The ECC state machine 512 outputs to the synchronizing logic 516 the index X (a number between 1 and N identifying the position of a word in a block data transfer) of the word erroneously transmitted. Other inputs to the synchronizing logic 516 include the modified write data strobe 525 and the current count from the block counter 514, which counts from 1 to N, incrementing the count on every cycle of the modified write data strobe. When the count from the block counter 514 matches the index X (which will only occur during the next block being transferred—see example below), the synchronizing logic outputs a one-clock period mask enable signal to the AND gate 518, which as a result, transmits the error mask latched at the output of the ECC state machine into the XOR gate. As a result, the Correction mask is XORed with the erroneously transmitted word as that word is output from the last stage of the pipelined register 522 and the word in error is corrected on the fly. On words other than the index X, the gate 518 will output zeros, and the output of the XOR 520 will be the same as the input; i.e., unmodified data. In this way, only the words in error are in any way modified.

For example, given that error correction is being done in the negotiated block transfer mode with 4 word blocks and a sector size of 256 words (or 64 blocks), the following events occur over the course of the last two negotiated block data transfers. In this summary of events, the block associated with the various data items is shown in parentheses; e.g., ECC(63) denotes the ECC computed for the data words of block 63 and Word__0(63) is the first word of block 63.

| Block | Clock | Events |
|-------|-------|--------|
| 63 | 1 | ECC decoder resets ECC(63) |
|  |  | Word__0(63) received, stored in register 522-1 |
|  |  | ECC(63) computed |
|  | 2 | Word__1(63) transmitted in error |
|  |  | Word__1(63) received, stored in register 522-1 |
|  |  | ECC(63) recomputed |
|  |  | Word__0(63) stored in register 522-2 |
|  | 3 | Word__2(63) received, stored in register 522-1 |
|  |  | ECC(63) recomputed |
|  |  | Word__1(63) stored in register 522-2 |
|  |  | Word__0(63) stored in register 522-3 |
|  | 4 | Word__3(63) received, stored in register 522-1 |
|  |  | ECC(63) recomputed |
|  |  | Word__2(63) stored in register 522-2 |
|  |  | Word__1(63) stored in register 522-3 |
|  |  | Word__0(63) stored in register 522-4 |
|  |  | ECC(63) latched at output of ECC decoder |

| Block | Clock | Events |
|-------|-------|--------|
| 64 | 1 | ECC decoder resets ECC(64) |
|  |  | Word__0(64) received, stored in register 522-1 |
|  |  | ECC(64) computed |
|  |  | Word__0(63) output from reg. 522-1 to XOR 520 |
|  |  | Word__1(63) stored in register 522-4 |
|  | 2 | Word__1(64) received, stored in register 522-1 |
|  |  | ECC(64) recomputed |
|  |  | Word__0(64) stored in register 522-2 |
|  |  | Word__1(63) output from reg 522-4 to XOR 520 |
|  |  | synchronizing logic 516 asserts mask enable |
|  |  | Error Mask XORed with Word__1(63) |
|  |  | Corrected Word__1(63) stored in FIFO 520 |

Once the block 64 has been transferred to the device 104, the host 110 deactivates the IOW strobe, which causes the write data strobe to be deactivated. At this point, the sector size counter/clock, which counts the IOW strobes (here, 256) from the beginning of the data transfer, recognizes that the data transfer is complete, and generates the additional N (here, N=4) clock pulses needed to move all of the data words of block 64 out of the pipeline registers 522 for possible correction at the XOR gate 520.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the error correction/detection circuitry and methods of the present invention may be implemented and used in conjunction with other changes which might be made to the ATA standard to improve its reliability, such as adding a parity bit to each data word to be transferred. Moreover, the error detection/correction features of the present invention can be used in conjunction with slower legacy modes and independently of the implementation of the fast transfer mode of the present invention.

What is claimed is:

1. In a computer system having a host processor, a peripheral device such as a hard disk drive and a data bus including data lines carrying data signals when said bus is active and high impedance signals when said bus is inactive, DMA request and acknowledge lines and a data strobe line carrying a periodic data strobe, a method of implementing fast, ATA-compatible data transfers across said data bus between said host and said device, wherein said data transfer involves transferring a data block consisting of at least one data word, comprising the steps of:

(a) said device asserting a DMA request on said DMA request line at a first time;

(b) said host asserting a DMA acknowledge on said DMA acknowledge line at a second time in response to said DMA request;

(c) said host activating said data strobe at a third time, said third time being after said second time, the difference between said second and third times being long enough for a data word placed on said data bus at a fourth time between said second and third times to stabilize by said third time, said data strobe making a first transition at said third time and a second transition at a fifth time, the difference between said third and fifth times being long enough for a data word placed on said data bus at an sixth time between said third and fifth times to stabilize by said fifth time;

(d) a sender selected from said host or said device placing a first data word on said data bus at said fourth time, removing said first data word after said third time, and, without placing said data bus in a high impedance state, placing a second data word on said data bus at said sixth time;

(e) a receiver selected from the one of said host or said device not being said sender inputting said first and second data words from said data bus at said third and fifth times respectively; and (f) said host determining whether said device is compatible with said method, and if not, conducting said data transfer according to one of several legacy data transfer modes.

2. The method of claim 1 further comprising the step of detecting errors in said data transfer.

3. In a computer system having a host processor, a peripheral device such as a hard disk drive and a data bus including data lines carrying data signals when said bus is active and high impedance signals when said bus is inactive, DMA request and acknowledge lines and a data strobe line carrying a periodic data strobe, an ATA-compatible method of implementing fast data transfers across said data bus between said host and said device, wherein said data transfer involves transferring a data block consisting of at least one data word, comprising the steps of:

(a) said device asserting a DMA request on said DMA request line;

(b) said host asserting a DMA acknowledge on said DMA acknowledge line in response to said DMA request;

(c) activating said data strobe no earlier than a minimum setup time after the assertion of said DMA acknowledge, one data period of said data strobe consisting of alternating high and low strobe signals, said period having a duration of approximately 100 nanoseconds, said low and high strobe signals having a duration of no less than 40 nanoseconds;

(d) a sender selected from said host or said device placing a first data word on said data bus no later than 20 nanoseconds before said data strobe begins a first transition from said low to said high strobe signal, removing said first data word after said first transition, and immediately thereafter placing a second data word on said data bus no later than 20 nanoseconds before said data strobe begins a second transition from said high to said low strobe signal; and (e) a receiver selected from the one of said host or said device not being said sender receiving said first and second data words from said data bus upon the occurrence, respectively, of said first and second transitions;

said method resulting in a data transfer frequency across said data bus of approximately 40 MHz.

4. In an ATA device interface circuit responsive to external data signals, an external read strobe, an external write strobe, an external DMA acknowledge (DMA ACK) signal and an internal DMA request (DMA REQ) signal, wherein said device interface circuit includes a data bus, read and write pipeline registers, read and write FIFOs, a command decoder that generates a data transfer (DATA XFR) signal in response to a host data transfer command placed on said data bus, a transfer enable gate that generates a transfer enable (XFR ENA) signal when said DMA ACK and said DMA REQ signals are asserted, and read/write AND gates that generate read/write clock signals by ANDing said DATA XFR signal, XFR ENA signal and said external read/write strobes, said read pipeline register only being enabled for output to said data bus when said read clock signal is asserted, said write pipeline register inputting a data word from said data bus on every high to low transition of said write clock signal, the improvement comprising:

fast-transfer-enabling circuitry driven by said write clock and read clock signals and connected to said write and read pipeline registers for enabling said write and read pipeline registers to input and output said data from and to said data bus on every edge of said write and read clock signals, respectively;

command control logic with inputs tied to a status input from said first command decoder and said data bus, said command control logic asserting a READ COMMAND signal when solid first command decoder asserts said COAND/STATUS signal and continuing to assert said READ COMMAND as long as data transfer has not been finished; and a bus-enabling AND gate with two inputs tied respectively to said XFR ENA and said READ COMMAND signals, the output of said bus-enabling AND gate being an output enable (OE) signal that remains asserted as long as said data transfer is underway, said OE signal being tied to the output enable pin of said read pipeline register, thereby continually enabling said read pipeline register for output for low and high signal levels of said read clock signal.

* * * * *